US012654186B2

(12) United States Patent
Zhang et al.

(10) Patent No.: US 12,654,186 B2
(45) Date of Patent: Jun. 16, 2026

(54) APPARATUS FOR USE WITH MULTIPLE COUPLEABLE ACCESSORIES

(71) Applicant: The Clorox Company, Oakland, CA (US)

(72) Inventors: Li Zhang, Pleasanton, CA (US); Benjamin Ma, Pleasanton, CA (US); Paolo Contiero, Spinetta Marengo (IT); Massimo Repetto, Spinetta Marengo (IT)

(73) Assignee: THE CLOROX COMPANY, Oakland, CA (US)

( * ) Notice: Subject to any disclaimer, the term of this patent is extended or adjusted under 35 U.S.C. 154(b) by 75 days.

(21) Appl. No.: 18/609,644

(22) Filed: Mar. 19, 2024

(65) Prior Publication Data

US 2025/0296103 A1 Sep. 25, 2025

(51) Int. Cl.
*B05B 11/00* (2023.01)

(52) U.S. Cl.
CPC ................................ *B05B 11/0008* (2013.01)

(58) Field of Classification Search
CPC ............. B05B 11/0008; B05B 11/1047; B05B 11/001; B05B 11/1011; B05B 11/1045; B05B 11/1057; B05B 1/12; B05B 1/3436; B65D 41/0471
See application file for complete search history.

(56) References Cited

U.S. PATENT DOCUMENTS 4,346,821 A 8/1982 Wesner et al.
5,725,132 A 3/1998 Foster et al.
5,806,724 A 9/1998 Foster
5,810,209 A 9/1998 Foster
5,845,820 A 12/1998 Foster
5,928,594 A 7/1999 Foster
6,006,930 A 12/1999 Dreyer et al.
6,032,814 A 3/2000 Foster
6,126,090 A 10/2000 Wadsworth et al.
7,178,702 B2 2/2007 Maas et al.
7,478,739 B2 1/2009 Foster
8,297,479 B2 10/2012 Hoefing et al.
8,408,429 B2 4/2013 Dennis
(Continued)

FOREIGN PATENT DOCUMENTS

DE 202014102561 U1 8/2014
EP 0932580 8/1999
(Continued)

OTHER PUBLICATIONS

International Search Report and Written Opinion in counterpart International Application No. PCT/US2025/016576, mailed Jun. 23, 2025, 12 pages.
(Continued)

*Primary Examiner* — Vishal Pancholi
(74) *Attorney, Agent, or Firm* — Edell, Shapiro & Finnan, LLC

(57) ABSTRACT

An apparatus including a body, such as a bottle, that has an inner chamber or receptacle. The apparatus includes an accessory that is removably coupleable to the body. In one embodiment, the accessory can be a cap. In another embodiment, the accessory can be a dispensing mechanism. In yet another embodiment, the accessory can be a refill cartridge.

18 Claims, 17 Drawing Sheets

(56) References Cited

U.S. PATENT DOCUMENTS

| | | | |
|---|---|---|---|
| 8,408,430 | B2 | 4/2013 | Dennis |
| 8,453,950 | B2 | 6/2013 | Dennis |
| 8,608,033 | B2 | 12/2013 | Hoefing et al. |
| 8,627,985 | B2 | 1/2014 | Dennis |
| 8,800,822 | B2 | 8/2014 | Good et al. |
| 8,839,992 | B2 | 9/2014 | Dennis |
| 8,870,033 | B2 | 10/2014 | Alluigi et al. |
| 8,881,953 | B2 | 11/2014 | Dennis |
| 9,751,667 | B2 | 9/2017 | Guery et al. |
| 9,776,772 | B2 | 10/2017 | Tada et al. |
| 9,827,581 | B2 | 11/2017 | Good et al. |
| 9,878,834 | B2 | 1/2018 | Azelton et al. |
| 10,046,347 | B2 | 8/2018 | Alluigi |
| 11,014,107 | B2 | 5/2021 | Alluigi |
| 11,198,546 | B2 | 12/2021 | Guery et al. |
| 2008/0149587 | A1 | 6/2008 | Sweeton et al. |
| 2008/0257913 | A1 | 10/2008 | Contiero |
| 2009/0152270 | A1 | 6/2009 | Crowe et al. |
| 2010/0018999 | A1 | 1/2010 | Maas et al. |
| 2011/0024465 | A1 | 2/2011 | Roosel et al. |
| 2011/0036927 | A1 | 2/2011 | Hensen |
| 2013/0118641 | A1 | 5/2013 | Beranger |
| 2020/0246817 | A1 | 8/2020 | Maas et al. |
| 2020/0261934 | A1* | 8/2020 | Alluigi .................. B05B 11/001 |
| 2023/0149960 | A1 | 5/2023 | Beranger et al. |
| 2024/0269699 | A1 | 8/2024 | Alluigi |

FOREIGN PATENT DOCUMENTS

| | | | |
|---|---|---|---|
| EP | 1020232 | A2 | 7/2000 |
| EP | 1345702 | | 9/2003 |
| EP | 1007471 | | 6/2006 |
| EP | 2001792 | A2 | 12/2008 |
| EP | 2125244 | | 12/2009 |
| EP | 2600984 | | 6/2013 |
| EP | 2611707 | | 7/2013 |
| EP | 2708472 | A1 | 3/2014 |
| EP | 3223959 | | 10/2017 |
| WO | 2016/009192 | A1 | 1/2016 |
| WO | 2019068774 | A1 | 4/2019 |
| WO | 2019092517 | A1 | 5/2019 |
| WO | 2024097502 | A1 | 5/2024 |

OTHER PUBLICATIONS

Originally filed specification and drawings for pending U.S. Appl. No. 18/481,317, filed Oct. 5, 2023, entitled “Apparatus for Use With Multiple Coupleable Accessories”, 29 pages.

* cited by examiner

APPARATUS FOR USE WITH MULTIPLE COUPLEABLE ACCESSORIES

FIELD OF THE INVENTION

The present invention is directed generally to an apparatus that can contain a chamber in which a material can be placed, and more specifically, to an apparatus that has a chamber that can contain a material and to which multiple accessories can be coupled.

BACKGROUND

Devices for receiving and containing materials therein are well known. Typically, such a device is a container, such as a bottle, that has an internal chamber in which a material, such as a fluid, can be located. In one exemplary use, a dispensing accessory, such as a spray head, is removably coupled to the bottle so that a user can dispense a material, such as a fluid, from the bottle. Often a significant force is required to remove the accessory from the bottle.

There is a need for an apparatus that facilitates the mounting and the removal of an accessory from a body, such as a bottle. There is also a need for an apparatus that can be easily removed from the body without the need for a significant force.

SUMMARY

In one embodiment of the invention, an apparatus comprises a body defining a chamber, the body including a neck portion having a collar with an outer surface, the outer surface of the neck portion including a plurality of engagement members thereon, the plurality of engagement members includes a first engagement member, and an accessory removably coupleable to the body, wherein the accessory includes a coupling portion with a coupling structure that engages with at least one of the plurality of engagement members on the neck portion of the body to couple the accessory to the body, and the first engagement member guides the accessory onto the neck portion of the body for mounting thereto, and also assists with removal of the accessory from the neck portion.

In an alternative embodiment, the first engagement member is a ramp.

In an alternative embodiment, the ramp extends outwardly from the outer surface of the collar, and the ramp includes a ramp surface that is oriented at an angle with respect to the outer surface of the neck portion.

In an alternative embodiment, the ramp surface is oriented perpendicularly to the outer surface of the neck portion.

In an alternative embodiment, the plurality of engagement members also includes a second engagement member spaced apart from the first engagement member, the first engagement member being a first ramp, and the second engagement member being a second ramp.

In an alternative embodiment, the first ramp has a first height, the second ramp has a second height, and the second height is different from the first height.

In an alternative embodiment, the plurality of engagement members also includes a second engagement member and a third engagement member, each of the second engagement member and the third engagement member being spaced apart from each other and from the first engagement member, the first engagement member is a first ramp, the second engagement member is a second ramp, and the third engagement member is a third ramp.

In an alternative embodiment, the first ramp has a first height, the second ramp has a second height, and the third ramp and a third height, and each of the first height, the second height, and the third height is different from the other ones of the first height, the second height, and the third height.

In an alternative embodiment, the neck portion has a longitudinal axis extending therethrough, the first ramp has a first ramp surface, the second ramp has a second ramp surface, and the third ramp has a third ramp surface, and each of the first ramp surface, the second ramp surface, and the third ramp surface is oriented in the same direction about the longitudinal axis.

In an alternative embodiment, the coupling structure is a first coupling structure, the accessory includes a second coupling structure and a third coupling structure, and each of the first coupling structure, the second coupling structure, and the third coupling structure engages one of the first ramp, the second ramp, and the third ramp when the accessory is engaged with the neck portion.

In an alternative embodiment, the accessory is rotatable on the neck portion in a first direction and in a second direction opposite the first direction, the coupling structure slides along the first engagement member when the accessory rotates in the first direction, and the coupling structure slides along the first engagement member when the accessory rotates in the second direction.

In an alternative embodiment, the first engagement member guides the accessory onto the neck portion when the accessory rotates in the first direction, and the first engagement member directs the accessory off the neck portion when the accessory rotates in the second direction.

In another embodiment of the invention, an apparatus comprises a body defining a chamber, the body including a neck portion having a collar with an outer surface, the outer surface of the neck portion including a plurality of engagement members thereon, the plurality of engagement members includes a first engagement member and a second engagement member spaced apart from the first engagement member, and an accessory removably coupleable to the body, the accessory includes a coupling portion with a first coupling structure and a second coupling structure spaced apart from the first coupling structure, wherein when the accessory is engaged with the neck portion, the accessory can be rotated in a first direction relative to the neck portion and in a second direction relative to the neck portion, the second direction being opposite to the first direction, the first coupling structure and the second coupling structure slide along the first engagement member and the second engagement member, respectively, when the accessory is rotated in the first direction, and the first coupling structure and the second coupling structure slide along the first engagement member and the second engagement member, respectively, when the accessory is rotated in the second direction.

In an alternative embodiment, the first engagement member is a first ramp having a first ramp surface, and the second engagement member is a second ramp having a second ramp surface.

In an alternative embodiment, the first coupling structure and the second coupling structure slide along the first engagement member and the second engagement member, respectively, when the accessory is rotated in the first direction, and the first coupling structure and the second coupling structure slide along the first engagement member and the second engagement member, respectively, when the accessory is rotated in the second direction.

In an alternative embodiment, the first engagement member and the second engagement member guide the accessory onto the neck portion when the accessory is rotated in the first direction, and the first engagement member and the second engagement member direct the accessory off the neck portion when the accessory is rotated in the second direction. In another embodiment of the invention, an apparatus for dispensing a product comprises a body defining a chamber, the body including a neck portion having a collar with an outer surface, the outer surface of the neck portion including a plurality of engagement members thereon, the plurality of engagement members includes a first engagement member, and a dispensing mechanism removably coupleable to the body, wherein the dispensing mechanism includes a coupling portion with a coupling structure that engages with at least one of the plurality of engagement members on the neck portion of the body to couple the dispensing mechanism to the body, and the first engagement member has a ramp surface that guides the dispensing mechanism onto the neck portion of the body for mounting thereto, and also assists with removal of the dispensing mechanism from the neck portion.

In an alternative embodiment, the first engagement member is a first ramp.

In an alternative embodiment, the plurality of engagement members includes a second engagement member and a third engagement member, the second engagement member is a second ramp having a second ramp surface, the third engagement member is a third ramp having a third ramp surface, and the dispensing mechanism includes a second contact member and a third contact member.

In an alternative embodiment, the first engagement member is a first ramp with a first height, the second ramp has a second height, and the third ramp and a third height, and each of the first height, the second height, and the third height is different from the other ones of the first height, the second height, and the third height.

In another embodiment of the invention, a method of using an apparatus, the apparatus including a body defining a chamber, the body including a neck portion having a collar with an outer surface including a plurality of engagement members thereon, the plurality of engagement members includes a first engagement member, and the apparatus includes an accessory removably coupleable to the body, the method comprising the steps of engaging the accessory with the neck portion, rotating the accessory relative to the neck portion in a first direction so that a first contact member of the accessory slides along the first engagement member and the first engagement member guides movement of the accessory relative to the neck portion as the accessory is rotated, and securing the accessory in a locked position on the neck portion.

In an alternative embodiment, the first engagement member is a first ramp having a first ramp surface, and the step of engaging the accessory with the neck portion includes engaging the first contact member of the accessory with the first ramp surface of the first ramp.

In an alternative embodiment, the plurality of engagement members includes a second engagement member and a third engagement member, the second engagement member is a second ramp having a second ramp surface, the third engagement member is a third ramp having a third ramp surface, and the accessory includes a second contact member and a third contact member, wherein the step of engaging the accessory with the neck portion includes engaging the second contact member of the accessory with the second ramp surface of the second ramp, and engaging the third contact member of the accessory with the third ramp surface of the third ramp.

In an alternative embodiment, the method further comprises moving the accessory from the locked position; and rotating the accessory relative to the neck portion in a second direction opposite to the first direction so that the first contact member of the accessory slides along the first engagement member and the first engagement member guides movement of the accessory relative to the neck portion in a third direction away from the body.

DETAILED DESCRIPTION

Figure 1A:
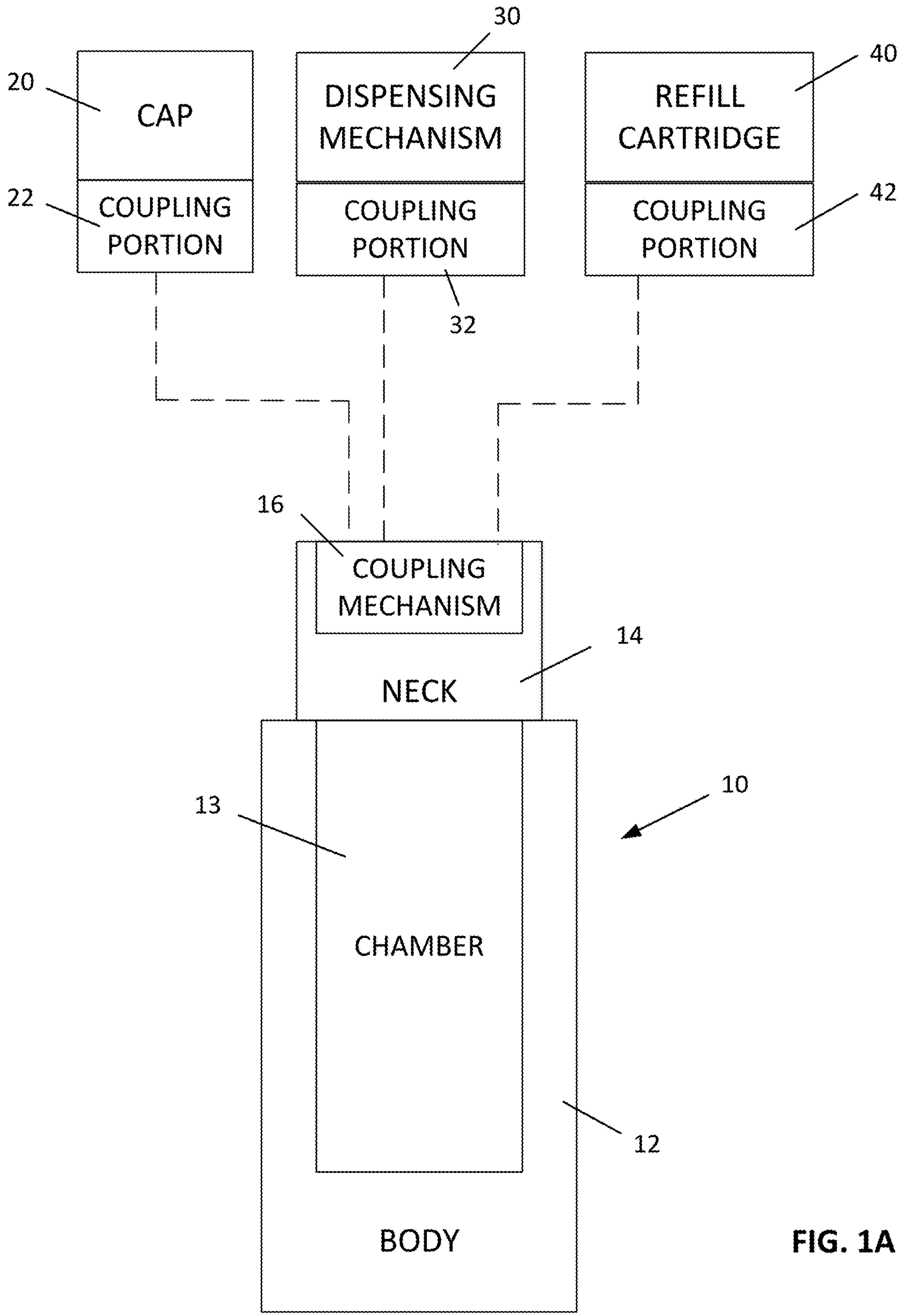
FIG. 1A is a schematic block diagram of an apparatus according to an embodiment of the present invention.

The present invention is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention relates to an apparatus that has a chamber in which a material can be placed. In one embodiment, the apparatus includes a body, such as a bottle, that has an inner chamber or receptacle in which a material can be located. In one implementation, the material in the chamber of the body is a concentrate. In another implementation, the material in the chamber of the body is a concentrate in another form that is diluted. In yet another implementation, the material in the chamber of the body may be a fluid, which in different embodiments can be a water or a solution. In addition, the apparatus does not have to contain any material therein when used, shipped, transported, etc.

The apparatus includes an accessory that is removably coupleable to the body. In one embodiment, the accessory can be a cap. In another embodiment, the accessory can be a dispensing mechanism. In yet another embodiment, the accessory can be a refill cartridge that contains a material, which can be in any form. To close the chamber of the body, and retain any material, if present, in the chamber, the cap can be coupled to the body. To utilize a refill cartridge with the body, the refill cartridge can be coupled to the body and any material in the refill cartridge can be released or inserted into the chamber of the body. To utilize a dispensing mechanism to dispense a material in the body, a user can couple a dispensing mechanism to the body. The dispensing mechanism can be manipulated by a user to dispense the material, such as by spraying. Depending on the desired distribution of the material in the body, a user may desire to change the particular dispensing mechanism that is coupled to the body so that the particular desired distribution can be achieved.

In one or more embodiments, the container is a bottle to which a dispensing accessory, such as a spray head is coupled. Some bottles with dispensing or delivery accessories as discussed above are described in U.S. Pat. Nos. 8,297,479; 8,408,429; 8,408,430; 8,453,950; 8,800,822; 8,870,033; 8,881,953; 9,751,667; 9,827,581; 9,878,834; 11,014,107; and 11,198,546, the disclosures of each of which are incorporated herein by reference in their entirety.

The apparatus includes a body with a neck portion that includes a collar. The collar includes a coupling portion that can be engaged by coupling structures of an accessory. The coupling portion has a reduced quantity of features that reduces the vertical removal force needed to remove the accessory from the neck portion. Some of the features of the coupling portion also includes engagement members that guide the accessory onto the neck portion and that facilitate the remove of the accessory because it guides the accessory off the neck portion. The guiding onto the neck portion and the guiding off the neck portion result from rotating the accessory relative to the neck portion in opposite directions. By making it easier for a consumer to remove the accessory, such as a refill cartridge, a cap, or a spray head, from the bottle, it will be easier for the consumer to access the chamber of the bottle, and if desired, even refill the bottle.

The coupling portion of the neck portion size includes engagement members that are ramps with ramp surfaces that make the spray head coming off the bottle easier for consumers. In addition, by reducing the size and length of any ribs on the neck portion, it is easier for a consumer to turn the accessory on the neck portion. While consumers need to apply a vertical force to the accessory to pull it off a conventional neck portion, the present invention utilizes ramps that direct the accessory off the neck portion as it is rotated. In other words, rotation of the accessory in a particular direction results in the movement of the accessory in a direction off the bottle. While the neck portion is ramped, it enables straight downward attachment as well as twist on and off ability.

An additional benefit of the present invention is that even though the coupling portion of the neck portion of a body is structured to facilitate or simplify removal of the accessory from the neck portion, the coupling portion does not result in the separation of an accessory from a body during transportation or shipment. In some instances, an accessory, such as a cap or a dispensing mechanism, may separate from a body, such as a bottle, during transportation when a vertical force is applied or a sudden vertical movement occurs. As described in detail below, the easy removal of an accessory according to the invention occurs when the accessory is rotated relative to the neck portion of the body. In particular, rotation of the accessory results in coupling structures contacting and sliding along engagement members on the neck portion that cause the accessory to move away from the body as it rotates.

Referring now to FIG. 1A, a schematic block diagram of an embodiment of an apparatus according to the present invention is illustrated. In this embodiment, the apparatus 10 includes a container or body 12 that defines an internal receptacle or chamber 13. In some embodiments, the body 12 can be referred to alternatively as a bottle. In various embodiments, the size and shape of the body 12 and the chamber 13 can vary.

Coupled to an end of the body 12 is a neck or neck portion 14 that extends away from the body 12. The neck portion 14 has a coupling mechanism 16, which in different embodiments can be either formed integrally with the neck portion 14 or formed separately from the neck portion 14 and subsequently coupled thereto. Exemplary features of the coupling mechanism 16 are described in greater detail below.

In one embodiment, the apparatus 10 includes one or more accessories that can be coupled to the body 12. Each of the accessories has a coupling portion that can engage with the coupling mechanism 16 of the neck portion 14.

One embodiment of an accessory is a cap 20 that can engage the coupling mechanism 16 to couple and secure the cap 20 to the body 12. The cap 20 can be used to close the chamber 13 and retain any material in the chamber 13 therein, or to simply prevent items from entering the chamber 13 when it is empty. Cap 20 has a coupling portion 22 that in various embodiments may include one or more different coupling structures.

Another embodiment of an accessory is a dispensing mechanism 30 that also can engage the coupling mechanism 16 to couple and secure the dispensing mechanism 30 to the body. One implementation of a dispensing mechanism 30 is a trigger-based dispensing or spray head that can be coupled to the body 12 and that can be used to spray a fluid that is in the body 12. Dispensing mechanism 30 has a coupling portion 32 that in various embodiments may include one or more different coupling structures.

Another embodiment of an accessory is a refill cartridge 40 that may contain material in any form, including a concentrate, a concentrate in a diluted form, or a fluid. The refill cartridge 40 can also engage the coupling mechanism 16 to couple and secure the refill cartridge 40 to the body 12. Refill cartridge may be any shape or sized container, and has a coupling portion 42 that has one or more different coupling structures that can engage the coupling mechanism 16 of the body 12.

Figure 1B:
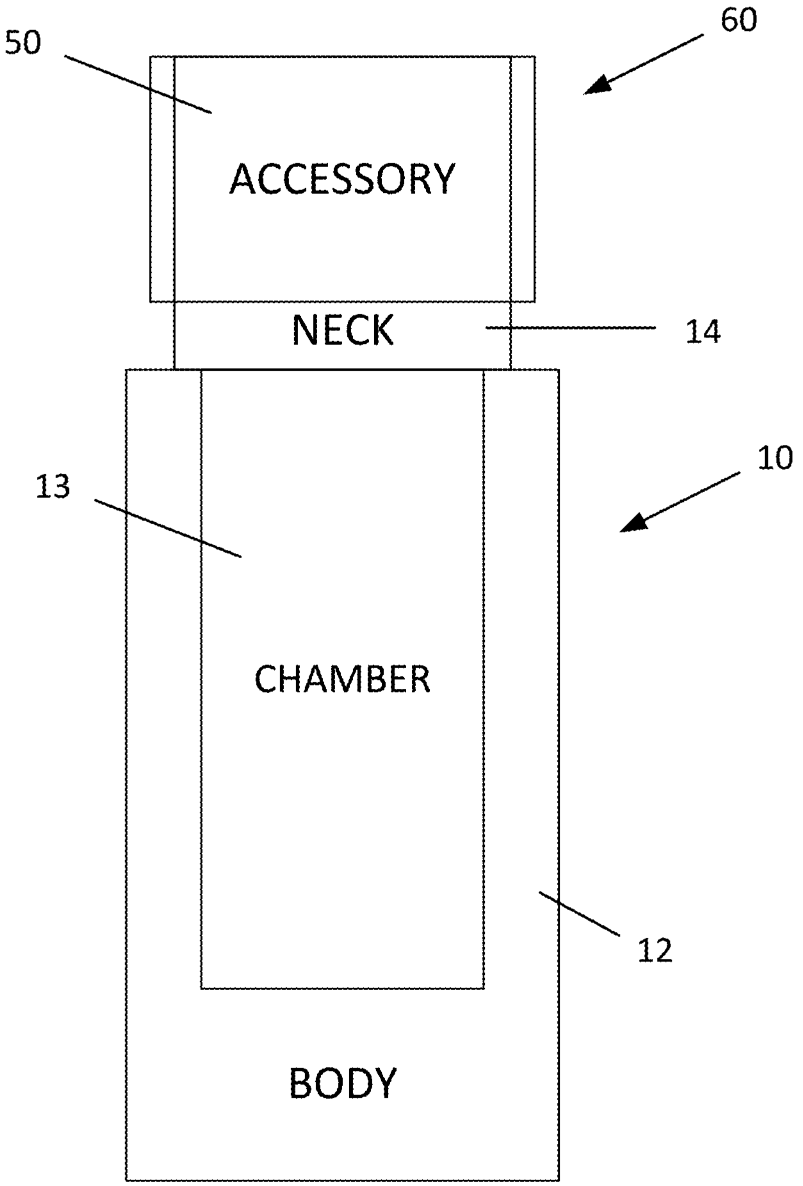
FIG. 1B is a schematic block diagram of the apparatus of FIG. 1A showing an accessory mounted onto the neck of the body.

As shown in FIG. 1B, an exemplary accessory 50, which can be any one of the accessories 20, 30, or 40 illustrated in FIG. 1A or a different accessory, can be mounted onto the neck 14 of the body 12 and secured in a locked or mounted position 60 on the neck 14. The accessory 50 can be secured in its locked position by the engagement of coupling structures on each of the accessory 50 and the neck 14.

Figure 2:
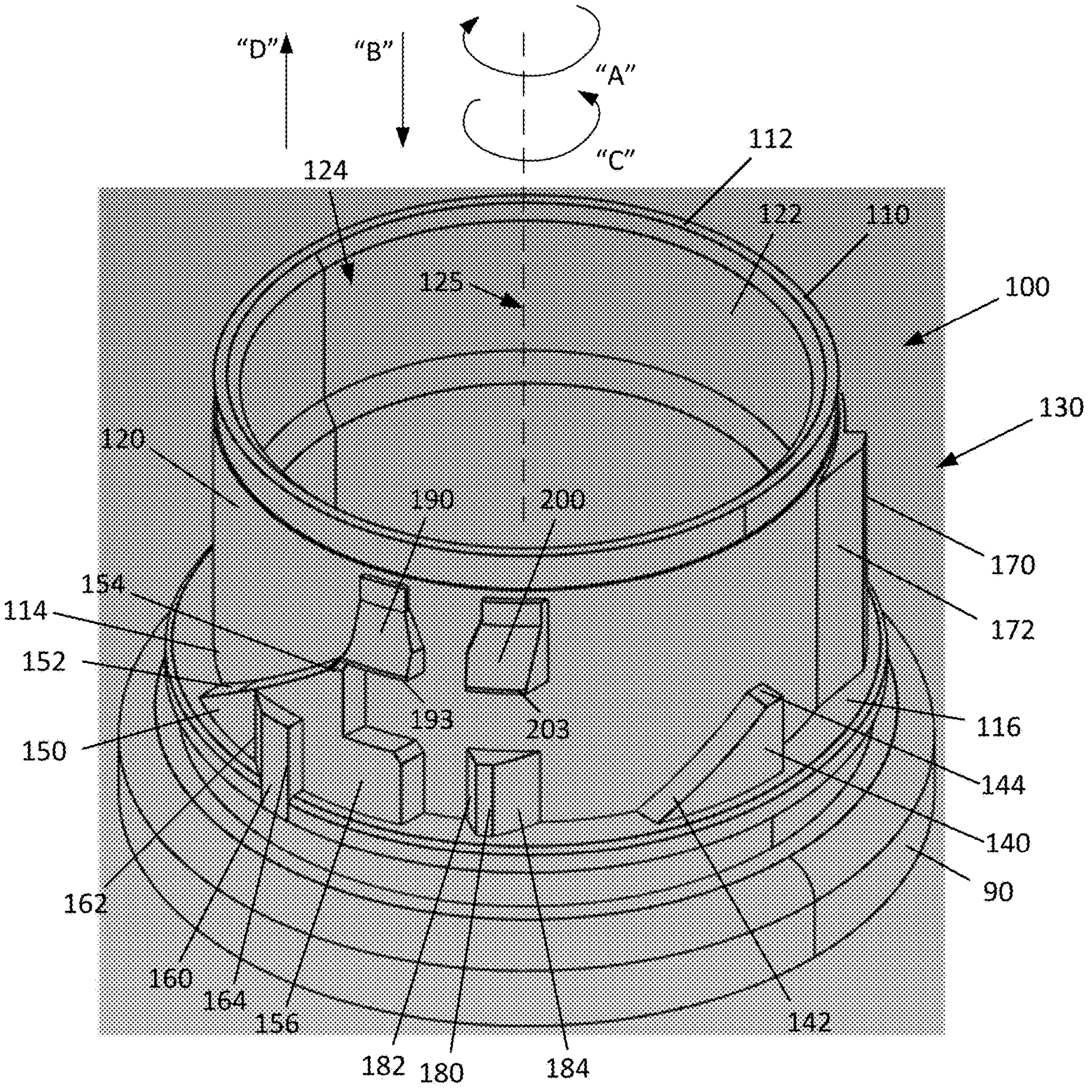
FIG. 2 is a top perspective view of an embodiment of a neck portion of a collar of a body of an apparatus according to the present invention.

Turning to FIG. 2, a top perspective view of an embodiment of a neck portion according to the present invention is illustrated. In FIG. 2 and in the subsequent drawings, only the neck portion of the body is illustrated. It is to be understood that the rest of the body below the neck portion can any shape or configuration provided that it has a chamber or receptacle in which a material is located. In some implementations, the body is a bottle that has a chamber.

Referring to FIG. 2, the top portion of the bottle or body 90 that contains the neck portion 100 of the body 90 is illustrated. As shown, the neck portion 100 includes a collar 110 that has an upper end 112 and a lower end 114 opposite to the upper end 112. Proximate to the lower end 114 is a limiting surface 116. The collar 110 has an outer surface 120 that extends around the outer perimeter of the collar 110. The collar 110 also has an inner surface 122 that is opposite to the outer surface 120, and that extends around the inner perimeter of the collar 110. The inner surface 122 defines a passageway 124 through the collar 110 that is in communication with the chamber in the body 90. The collar 110 also has a longitudinal axis 125 extending therethrough. The outer surface 120 has a coupling mechanism or coupling portion 130 that includes several features located around the perimeter of the outer surface 120. As described in greater detail below, the coupling mechanism 130 is used to guide movement of an accessory relative to the body 90, and to secure the accessory to the body 90.

In one implementation, the features of the coupling mechanism 130 are integrally formed with the neck portion 100. In a different implementation, the features of the coupling mechanism 130 are formed separately from neck portion 100 and subsequently are coupled thereto.

When an accessory, such as cap 20 or dispensing mechanism 30, is to be coupled to the body 90, the accessory is engaged with the neck portion 100. When the accessory is rotated about the longitudinal axis 125 along the direction of arrow "A", the accessory can move along the direction of arrow "B" toward the body 90 to a secured position on the neck portion 100. It is to be understood that the direction of arrow "B" is opposite to the direction of arrow "A". When the accessory is to be removed from the body 90, the accessory is rotated about the longitudinal axis 125 along the direction of arrow "C". Such rotation results in the accessory engaging the coupling mechanism 130 in a manner that results in the accessory moving along the direction of arrow "D". When the accessory has been moved sufficiently, it can be removed from the neck portion 100 and the body 90.

Several features of the coupling portion 130 on the neck portion 100 are configured to assist and simplify both the mounting of an accessory onto the neck portion 100 and the removal of the accessory from the neck portion 100. The coupling portion 130 guides movement of the accessory onto the neck portion 100. In addition, the coupling portion 130 guides movement of the accessory off the neck portion 100, thereby reducing the amount of force needed to separate the accessory from the body 90. In one embodiment, the coupling portion 130 includes at least one engagement member that is a ramp with a ramp surface. The coupling mechanism of an accessory engages with the ramp surface of the ramp. The ramp surface of the ramp is oriented so that rotation of the accessory along the direction of arrow "A" results in movement of the accessory along the direction of arrow "B." In addition, the ramp surface of the ramp is oriented so that rotation of the accessory along the direction of arrow "C" results in movement of the accessory along the direction of arrow "D."

Figure 6:
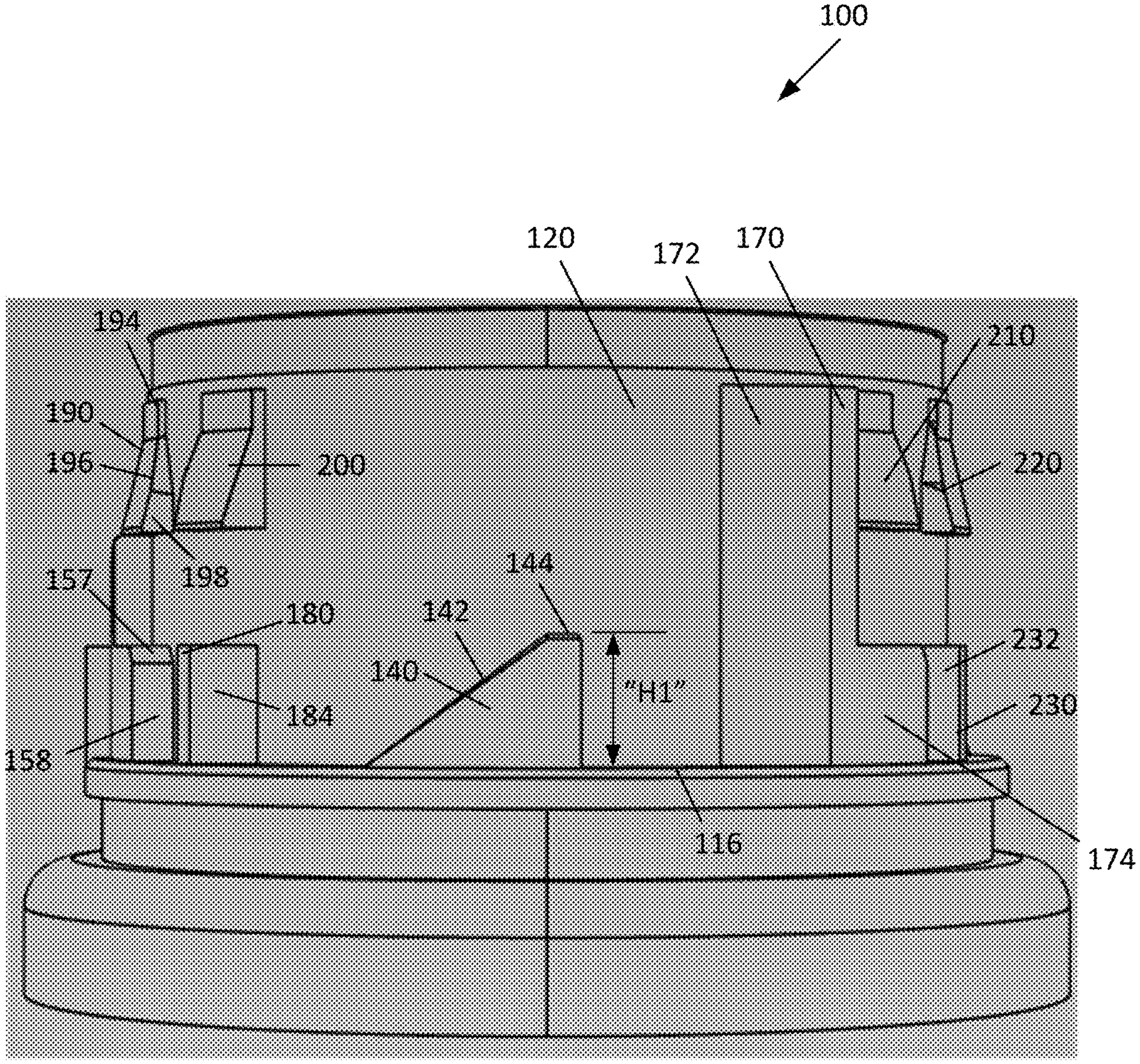
FIG. 6 is another side view of the neck portion illustrated in FIG. 2.

Referring to FIGS. 2 and 6, the coupling portion 130 includes an engagement member 140 that is located on the outer surface 120 of the collar 110. In one embodiment, the first engagement member 140 is a first ramp with a ramp surface 142 along which a coupling mechanism of an accessory can move or slide. The ramp surface 142 is oriented at an angle with respect to the outer surface 120 of the collar 110. In one embodiment, ramp surface 142 is oriented perpendicularly to the outer surface 120. The ramp 140 has an upper end 144 which, in this embodiment, is planar. As shown in FIG. 6, the first height "H1" of ramp 140 extends from surface 116 to the upper end 144 of the ramp 140.

Figure 5:
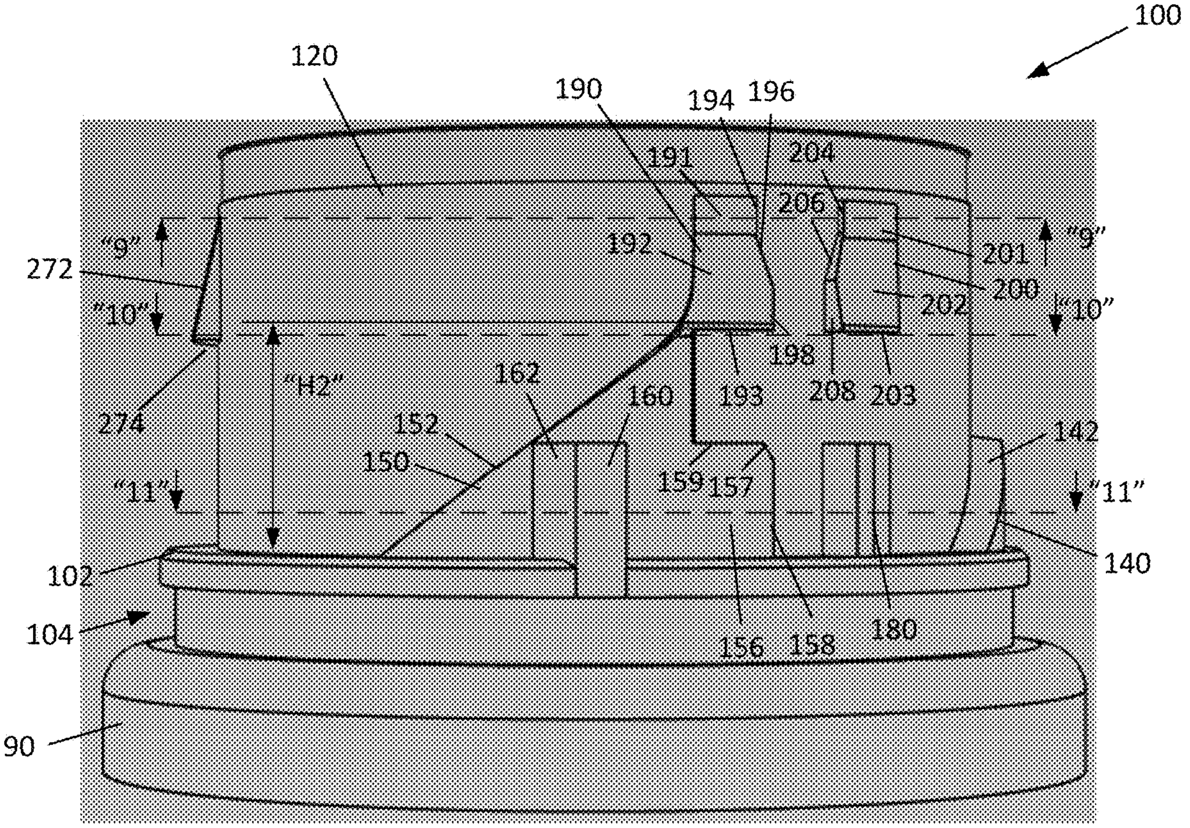
FIG. 5 is a side view of the neck portion of the collar illustrated in FIG. 2.

As shown in FIGS. 2, 5, and 6, the coupling portion 130 also includes projection 190 and projection 200 that extend from the outer surface 120 of the neck portion 100. The projections 190 and 200 are close to but spaced apart from each other. As best seen in FIG. 2, projection 190 has a lower surface 193 and similarly, projection 200 has a lower surface 203. Turning to FIGS. 5 and 6, projection 190 has a planar portion 191 that has a constant thickness and an angled portion 192 that has tapered profile from a thinner and narrower end proximate to planar portion 191 to a thicker and wider end proximate to lower surface 193. Projection 190 has several surfaces on its side facing projection 200. In particular, projection 190 has end surface 194, angled surface 196, and end surface 198. Similarly, as shown in FIG. 6, projection 200 has a planar portion 201 that has a constant thickness and an angled portion 202 that has tapered profile from a thinner and narrower end proximate to planar portion 201 to a thicker and wider end proximate to lower surface 203. Projection 200 has several surfaces on its side facing projection 190. In particular, projection 200 has end surface 204, angled surface 206, and end surface 208.

The lower surfaces 193 and 203 are abutted by a coupling structure of an accessory when the accessory is mounted onto the neck portion 100. The projections 190 and 200 have sufficient thicknesses at the lower surfaces 193 and 203 that prevent an accessory in its locked position on the neck portion 100 from being pulled directly off the neck portion 100 along the longitudinal axis 125.

Referring back to FIG. 2, the coupling portion 130 includes a projection 180 that extends part of the way up the outer surface 120. The projection 180 has opposing angled surfaces 182 and 184 that have different orientations and widths. Projection 180 is also illustrated in the side view of FIG. 5. Projection 180 is sized so that it engages a notch formed in the coupling portion the accessory mounted onto the neck portion 100.

As shown in FIG. 2, the coupling portion 130 includes another engagement member 150. In this embodiment, second engagement member 150 is a ramp that has a ramp surface 152 along which a coupling mechanism of an accessory can move or slide. Similar to ramp surface 142 of ramp 140, ramp surface 152 is oriented at an angle with respect to the outer surface 120 of the collar 110. Ramp surface 152 is oriented perpendicularly to the outer surface 120. The ramp 150 has an upper end 154 which, in this embodiment, is planar, and is smaller than upper end 144.

Second ramp 150 includes an extension portion 156 that is part of the ramp 150, but does not have any of the ramp surface 152. Referring to FIG. 5, the extension portion 156 has an upper surface 159 that is lower than the upper end 154. The extension portion 156 extends to an end surface 158, and has an angled surface 157 located between the end surface 158 and the upper surface 159. The ramp 150 also has a second height "H2" that extends from surface 116 to the upper end 154 of the ramp 150. In this embodiment, the second height "H2" is greater than the first height "H1". As a result, an accessory being mounted onto the neck portion 100 engages ramp 150 before it engages ramp 140 because ramp 150 has a greater height than ramp 140.

As shown in FIGS. 2 and 5, extending outwardly from the outer surface of the ramp 150 is a projection 160 that has an angled surface 162 on one side and a planar wall 164 on the opposite side.

Figure 3:
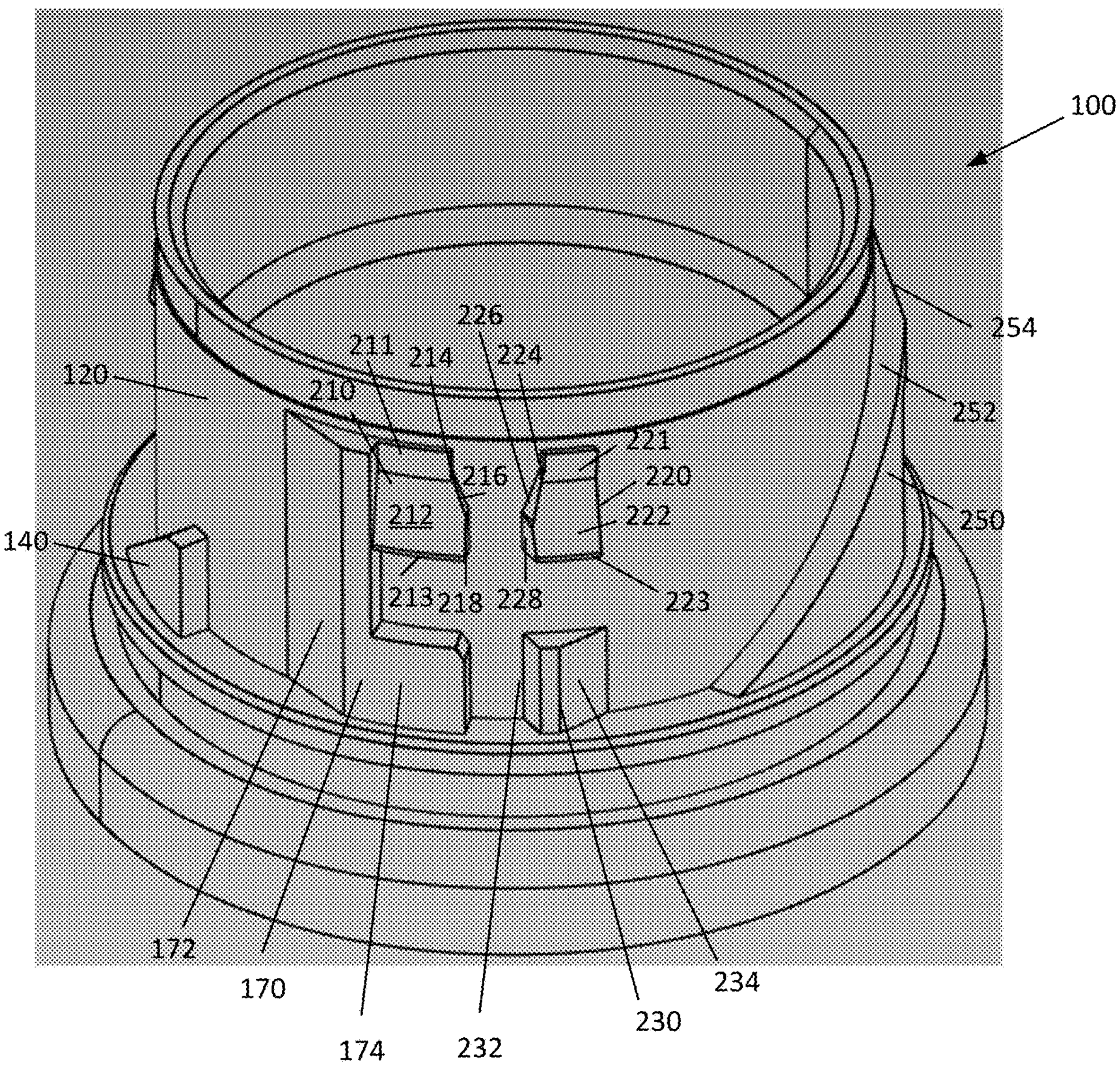
FIG. 3 is a different top perspective view of the neck portion illustrated in FIG. 2.

Also shown in FIG. 2, on the other side of ramp 140 from ramp 150, is a projection 170 that has an angled surface 172. Referring to FIG. 3, it can be seen that angled surface 172 is gradually sloped. Extending from the main portion of projection 170 is an extension portion 174. Extension portion 174 has a similar shape to extension portion 156 described above. In particular, extension portion 174 has an upper surface, an end surface, and an angled surface between its upper surface and its end surface.

The coupling portion 130 includes a projection 230 that is similarly configured to projection 180. Projection 230 has an angled surface 232 on one side and another angled surface 234 on an opposite side. Like projection 180, projection 230 engages a groove or notch formed in the coupling portion of the accessory.

In addition, the coupling portion 130 of the neck portion 100 includes a pair of engaging projections 210 and 220 that are located proximate to and closer to the distal end of the collar 110 than projection 230. In an arrangement similar to the locations of projections 190 and 200 relative to projection 180, projections 210 and 220 are spaced apart from projection 230.

Projections 210 and 220 extend from the outer surface 120 of the neck portion 100 in positions that are close to but spaced apart from each other. Projection 210 has a lower surface 213 and similarly, projection 220 has a lower surface 223. Projection 210 has a planar portion 211 that has a constant thickness and an angled portion 212 that has tapered profile from a thinner and narrower end proximate to planar portion 211 to a thicker and wider end proximate to lower surface 213. Projection 210 has several surfaces on its side facing projection 220. In particular, projection 210 has end surface 214, angled surface 216, and end surface 218. Similarly, projection 220 has a planar portion 221 that has a constant thickness and an angled portion 222 that has tapered profile from a thinner and narrower end proximate to planar portion 221 to a thicker and wider end proximate to lower surface 223. Projection 220 has several surfaces on its side facing projection 210. In particular, projection 220 has end surface 224, angled surface 226, and end surface 228.

The lower surfaces 213 and 223 are abutted by a coupling structure of an accessory when the accessory is mounted onto the neck portion 100. The projections 210 and 220 have sufficient thicknesses at the lower surfaces 213 and 223 that prevent an accessory in its locked position on the neck portion 100 from being pulled directly off the neck portion 100 along the longitudinal axis 125.

In this embodiment, the set of projections 190 and 200 has the same dimensions and spacing as the set of projections 210 and 220. Accordingly, the projections 190, 200, 210, and 220 are engaged by the coupling portion of the accessory simultaneously.

Figure 4:
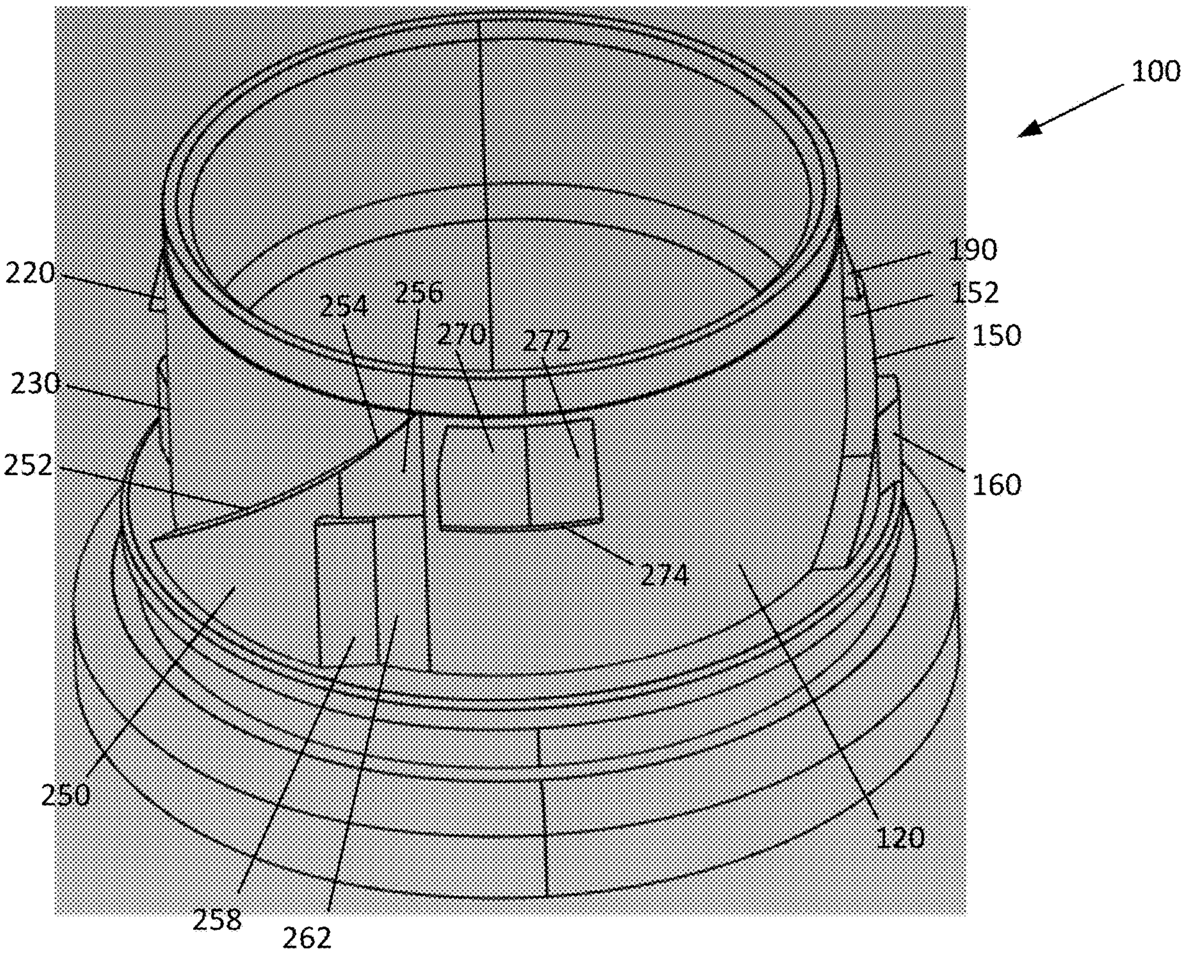
FIG. 4 is a different top perspective view of the neck portion illustrated in FIG. 2.

Referring to FIGS. 3 and 4, the coupling portion 130 includes another engagement member 250. In this embodiment, third engagement member 250 is a third ramp that has a ramp surface 252 along which a coupling mechanism of an accessory can move or slide. Similar to ramp surface 142 of ramp 140 and ramp surface 152 of ramp 150, ramp surface 252 is oriented at an angle with respect to the outer surface 120 of the collar 110. Ramp surface 252 is oriented perpendicularly to the outer surface 120. The ramp 250 has an upper end 254 which, in this embodiment, is angled relative to the outer surface 120. As shown in FIG. 3, upper end 254 is an edge that is not perpendicular to the outer surface 120. Turning to FIG. 4, upper end 254 is an edge of angled surface 256. The ramp 250 includes a notched portion that is formed by angled surface 258 and 260.

Figure 7:
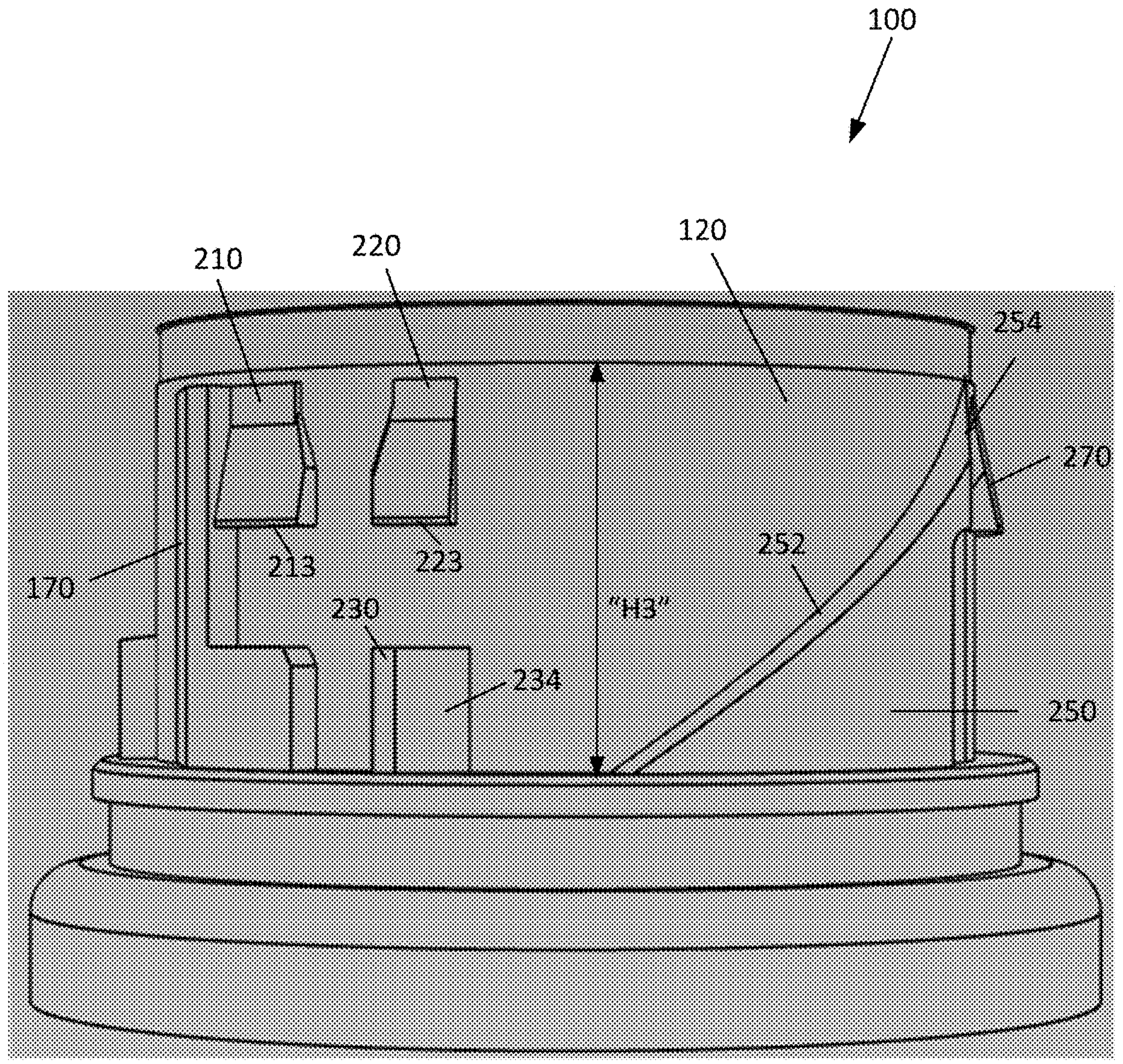
FIG. 7 is another side view of the neck portion illustrated in FIG. 2.
Figure 8:
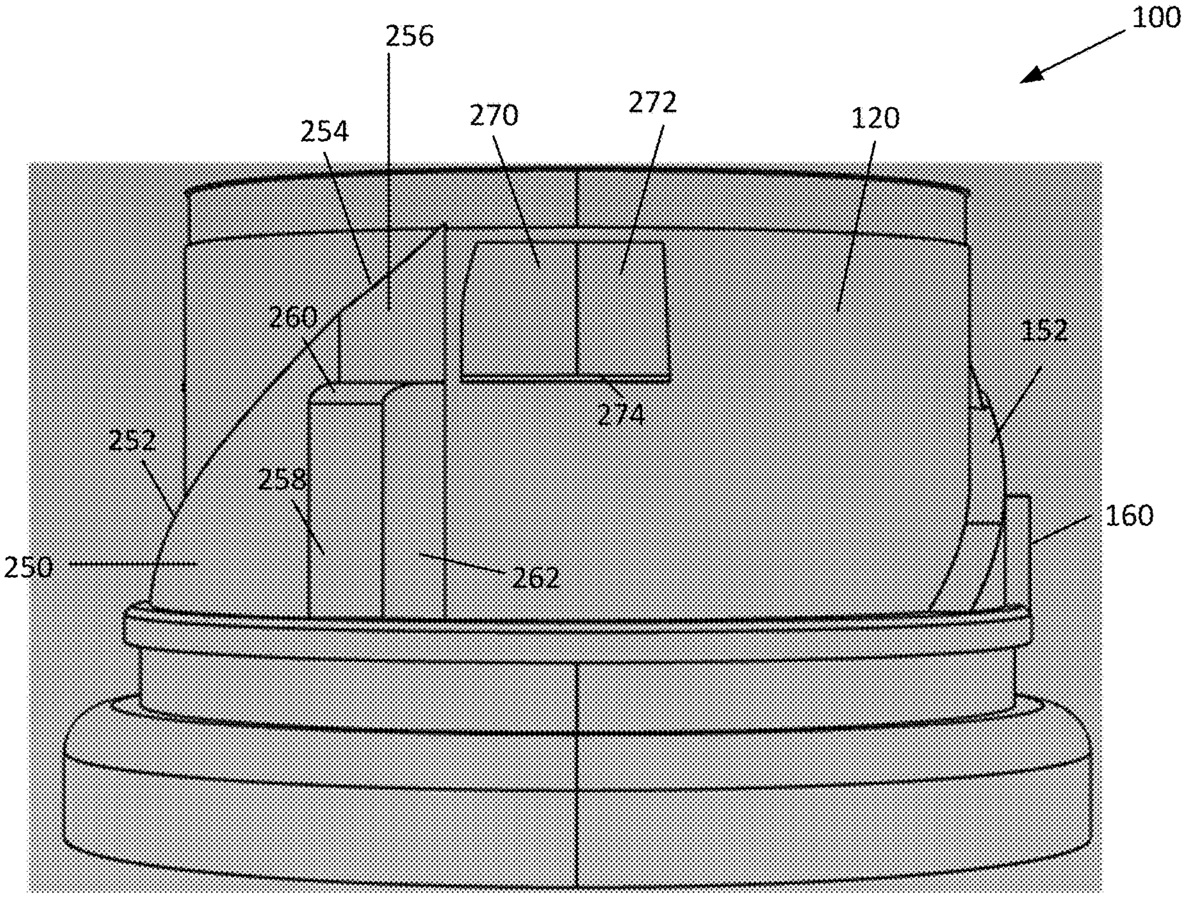
FIG. 8 is another side view of the neck portion illustrated in FIG. 2.

FIG. 7 illustrates the third height "H3" of the ramp 250 relative to surface 116. In this embodiment, the third height "H3" is greater than both first height "H1" and second height "H2". As a result, an accessory being mounted onto the neck portion 100 engages ramp 250 before it engages ramp 140 or ramp 150 because ramp 250 is the highest engagement member. Turning to FIG. 8, angled surfaces 258 and 262 are shown along with a downwardly, concavely curved surface 260 that is located below angled surface 256.

The remaining components or structures of the coupling portion 130 are a pair of projections 270 and 272 that are located adjacent to each other, and which have a lower surface 274, as shown in FIGS. 4 and 8.

Figure 9:
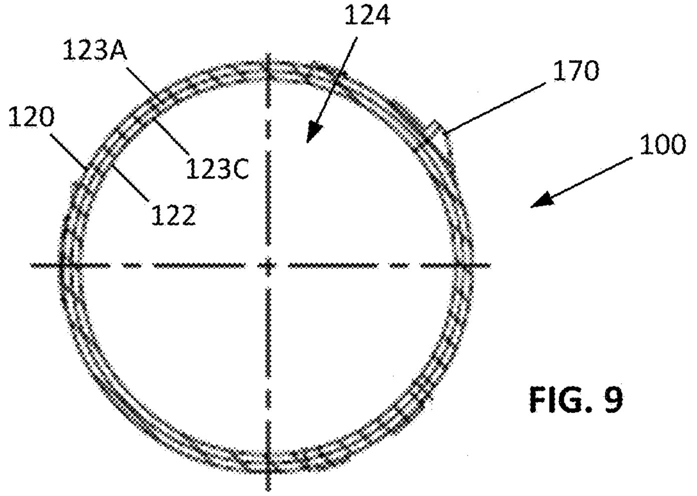
FIG. 9 is a cross-sectional plan view of the neck portion illustrated in FIG. 5 taken along the line "9"-"9" in FIG. 5.
Figure 10:
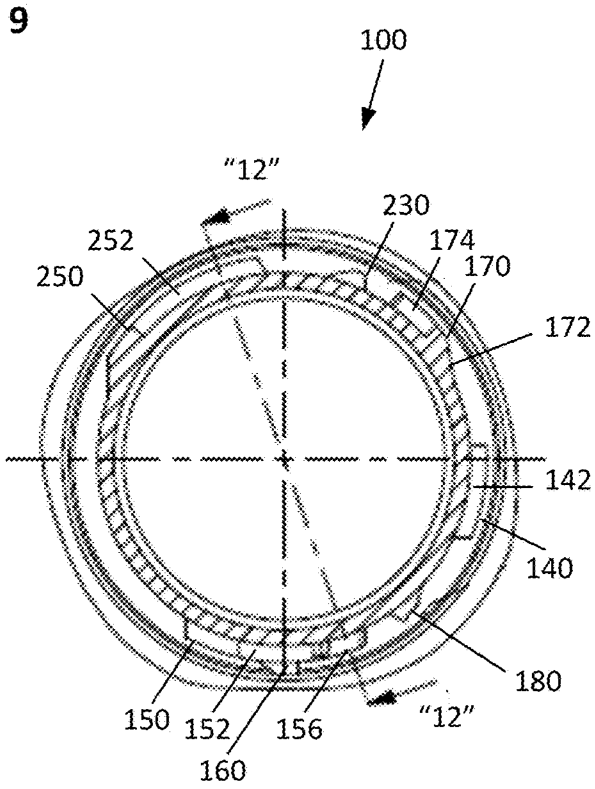
FIG. 10 is another cross-sectional plan view of the neck portion illustrated in FIG. 5 taken along the line "10"-"10" in FIG. 5.
Figure 11:
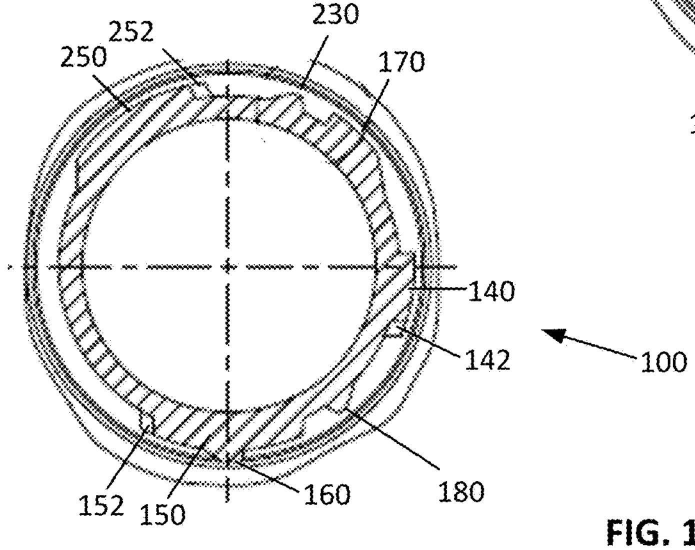
FIG. 11 is a cross-sectional plan view of the neck portion illustrated in FIG. 5 taken along the line "11"-"11" in FIG. 5.
Figure 12:
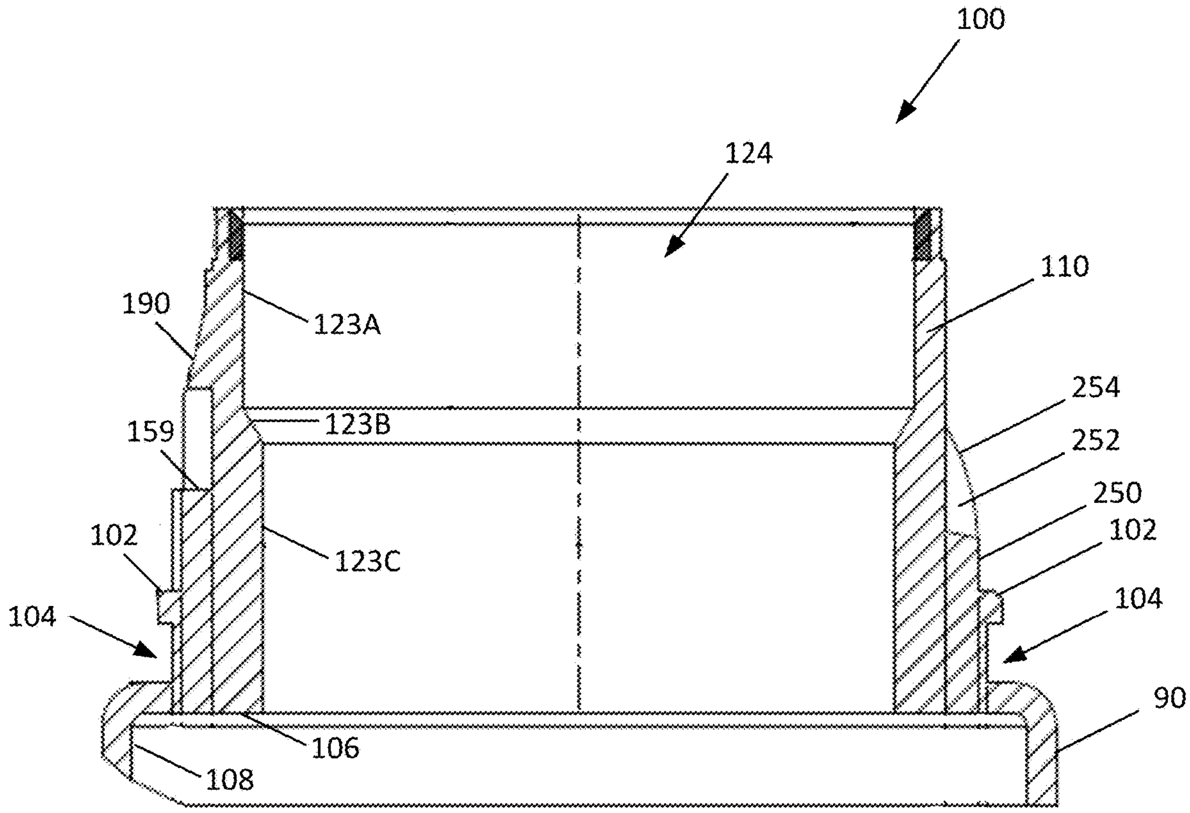
FIG. 12 is a cross-sectional side view of the neck portion illustrated in FIG. 5 taken along the line "12"-"12" in FIG. 10.

Turning to FIGS. 9-12, various cross-sectional views of the neck portion 100 are illustrated. FIGS. 9-11 are cross-sectional plan views of the neck portion illustrated in FIG. 5 taken along the line "9"-"9", the line "10"-"10", and the line "11"-"11", respectively. FIG. 12 is a cross-sectional side view of the neck portion illustrated in FIG. 5 taken along the line "12"-"12" in FIG. 10.

Initially referring to FIG. 12, the collar 110 of the neck portion 100 is shown coupled to the upper end of the body 90. The neck portion 100 includes an outwardly extending flange 102 that extends around the perimeter of the outer surface 120 of the neck portion 100. The body 90 includes a vertical wall 108 that is coupled to a horizontal wall 106. A groove 104 is defined by the flange 102, the horizontal wall 106, and the vertical wall 108.

Some of the features of the neck portion 100 are illustrated in FIG. 12. Each of the upper surface 159, projection 190, ramp 250, ramp surface 252, and upper end 254 of the ramp 250, which were discussed above, is illustrated. In addition, the varying thickness of the collar 110 in this embodiment is shown. The collar 110 has an upper portion 123A, an angled portion 123B, and a lower portion 123C. As shown, the lower portion 123C is thicker than the upper portion 123A, and the angled portion 123B has a tapered, varying thickness. The inner surface 122 of the collar 110, collectively formed by the surfaces of upper portion 123A, the angled portion 123B, and the lower portion 123C, defines the passageway 124 through the collar 110.

Turning now to FIG. 9, the inner surfaces of upper portion 123A and 123C are that form inner surface 122 are shown along with passageway 124. In addition, outer surface 120 and projection 170 extending therefrom are shown. Referring to FIG. 10, a cross-sectional view at a different level of the collar 110 is shown. The various engagement members 140, 150, and 250 are illustrated in their spaced apart positions around the outer perimeter of the collar 110. The ramp surfaces 142, 152, and 252 of engagement members 140, 150, and 250 are shown along with projections 170, 180, and 230. Another cross-sectional view at a different level of the collar 110 is shown in FIG. 11. Only small portions of the ramp surfaces 142, 152, and 252 of engagement members 140, 150, and 250 are visible in this view. Each of the projections 170, 180, and 230 is shown as well.

As shown in the drawings, each of the engagement members or ramps 140, 150, and 250 is oriented in the same direction about the longitudinal axis 125. In other words, the ramp surfaces 142, 152, and 252 are oriented and inclined in the same direction as each other, even though the heights of each of the engagement members 140, 150, and 250 varies.

Figure 13:
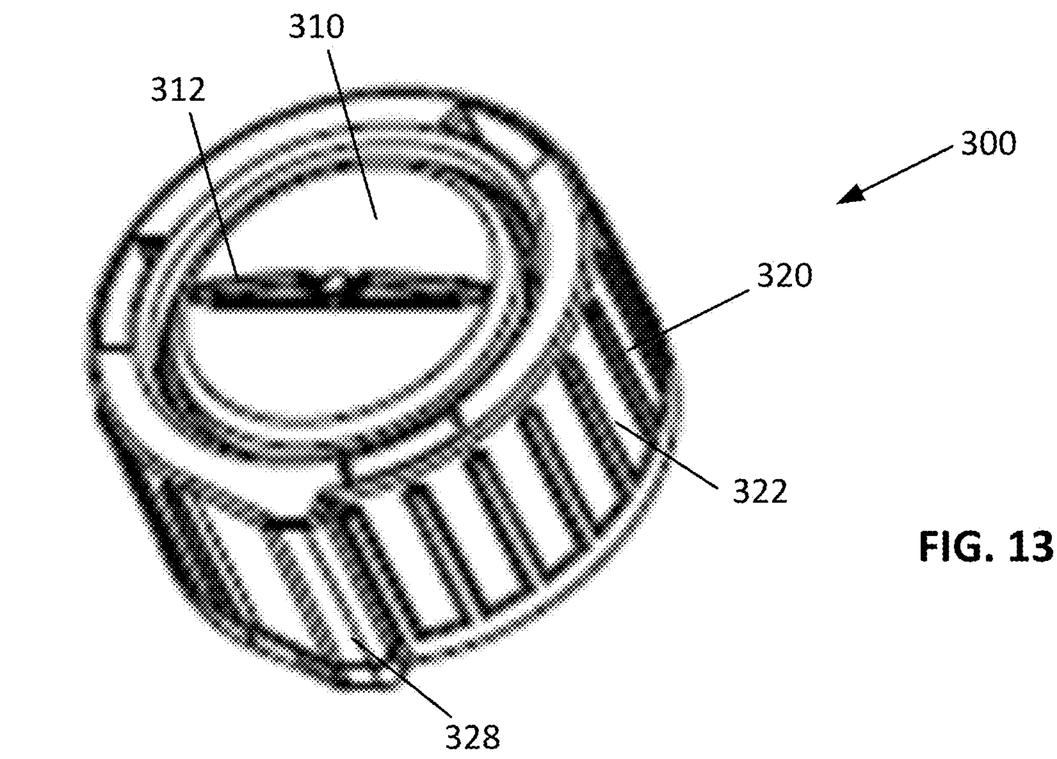
FIG. 13 is a top perspective view of an embodiment of an accessory that can be coupled to the neck portion illustrated in FIG. 2.
Figure 14:
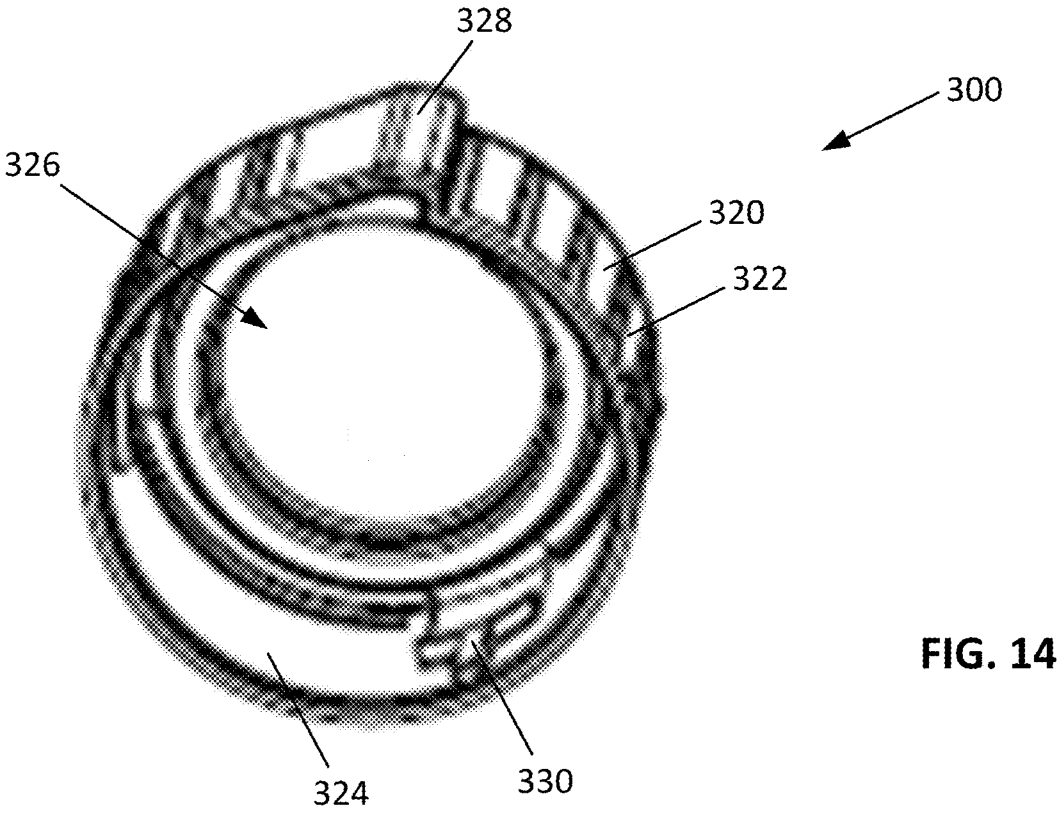
FIG. 14 is a bottom perspective view of the accessory illustrated in FIG. 13.

The coupling portion 130 of the neck portion 100 can be used to secure an accessory to the body 90. In one implementation, the accessory can be a cap 300, an embodiment of which is illustrated in FIGS. 13-18. Referring initially to FIGS. 13 and 14, the cap 300 includes a top 310 that has a projection 312 extending therefrom. A skirt or cylindrical portion 320 is coupled to the top 310 and extends downwardly therefrom. The skirt can be referred to alternatively as an annular member. The skirt 320 has an outer surface 322 and an inner surface 324 that defines a receptacle 326 in which the collar 110 of body 90 is inserted. The skirt 320 also includes an outwardly extending ridge 328 that can be engaged by a user to assist with rotating the cap 300 relative to the body 90 when they are engaged together.

Figure 15:
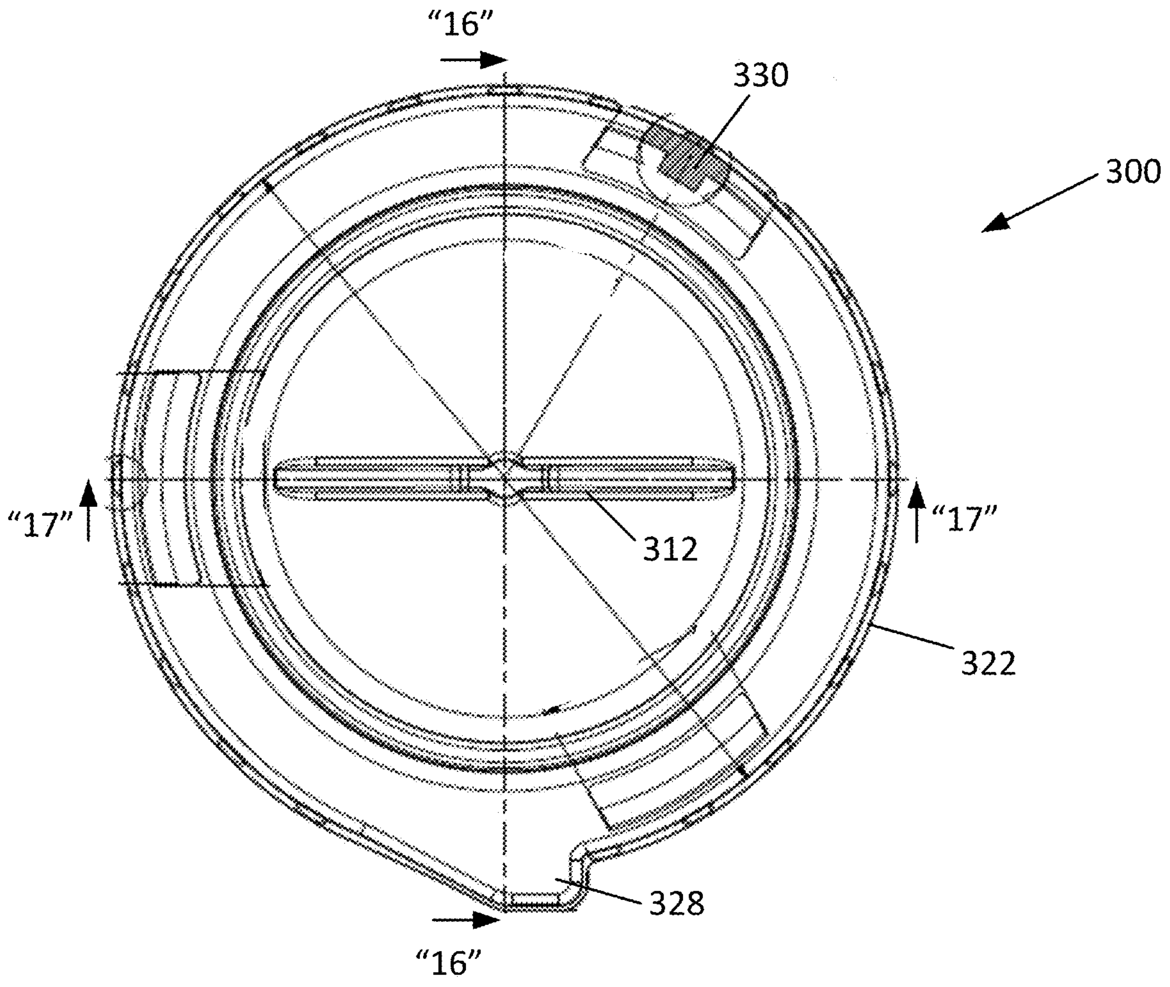
FIG. 15 is a top view of the accessory illustrated in FIG. 13.

A top view of the cap 300 is illustrated in FIG. 15. The outer surface 322 and the ridge 328 are visible in this view. A breakaway portion enables a portion of one of the coupling structures 330 to be seen. Lines "16"-"16" and "17"-"17" are shown that define the cross-sectional views illustrated in FIGS. 16 and 17, respectively.

Figure 16:
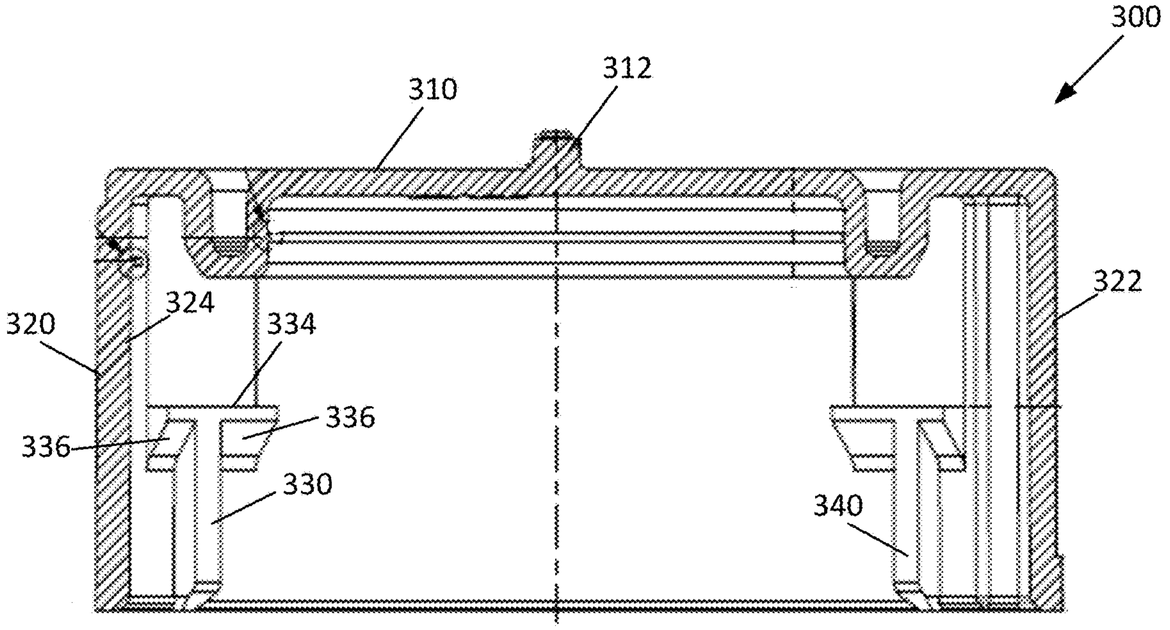
FIG. 16 is a cross-sectional side view of the accessory illustrated in FIG. 15 taken along the line "16"-"16" in FIG. 15.
Figure 17:
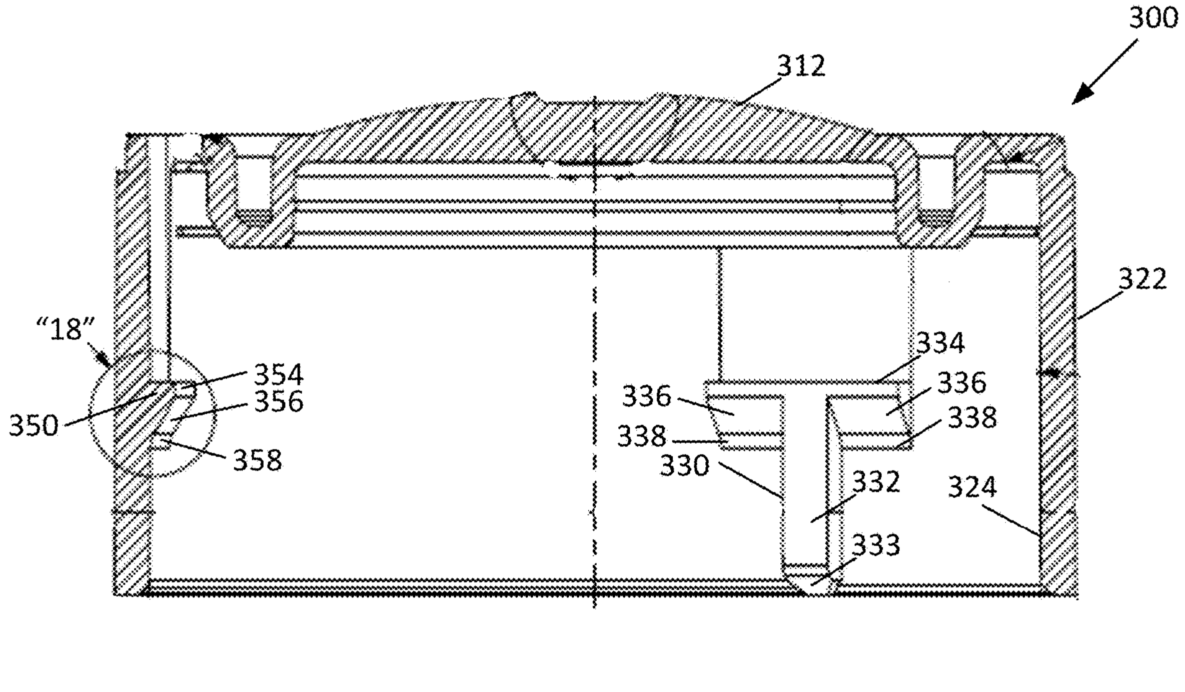
FIG. 17 is a cross-sectional side view of the accessory illustrated in FIG. 15 taken along the line "17"-"17" in FIG. 15.

Turning to FIGS. 16 and 17, side cross-sectional views of the cap 300 are illustrated. The projection 312 extends from the top 310 can is shown in an end view in FIG. 16 and in a side view in FIG. 17. The skirt 320 has an outer surface 322 and an inner surface 324. The skirt 320 also has a coupling portion that includes several different coupling structures or couplers that engage different components of the coupling portion 130 of the neck portion 100. The coupling structures 330, 340, and 350 are integrally formed with the skirt 320 and extend radially inwardly from inner surface 324. In an alternative embodiment, the coupling structures 330, 340, and 350 can be formed separately from and subsequently coupled to the inner surface 324.

Each of the coupling structures 330, 340, and 350 (noting that only a portion of coupling structure 350 is shown in FIG. 17) has a similar T-shaped structure. Coupling structure 330 has a vertical portion 332 with a bottom surface 333, and a horizontal portion 334 with angled surfaces 336 and curved surfaces 338 on opposite sides of the vertical portion 332. The bottom surface 333 engages one of the engagement members or ramps 140, 150, and 250 when the cap 300 is mounted onto the collar 110 of the neck portion 100. The bottom surface 333 slides or moves along the particular engagement member 140, 150, or 250 as the cap 300 is rotated.

Figure 18:
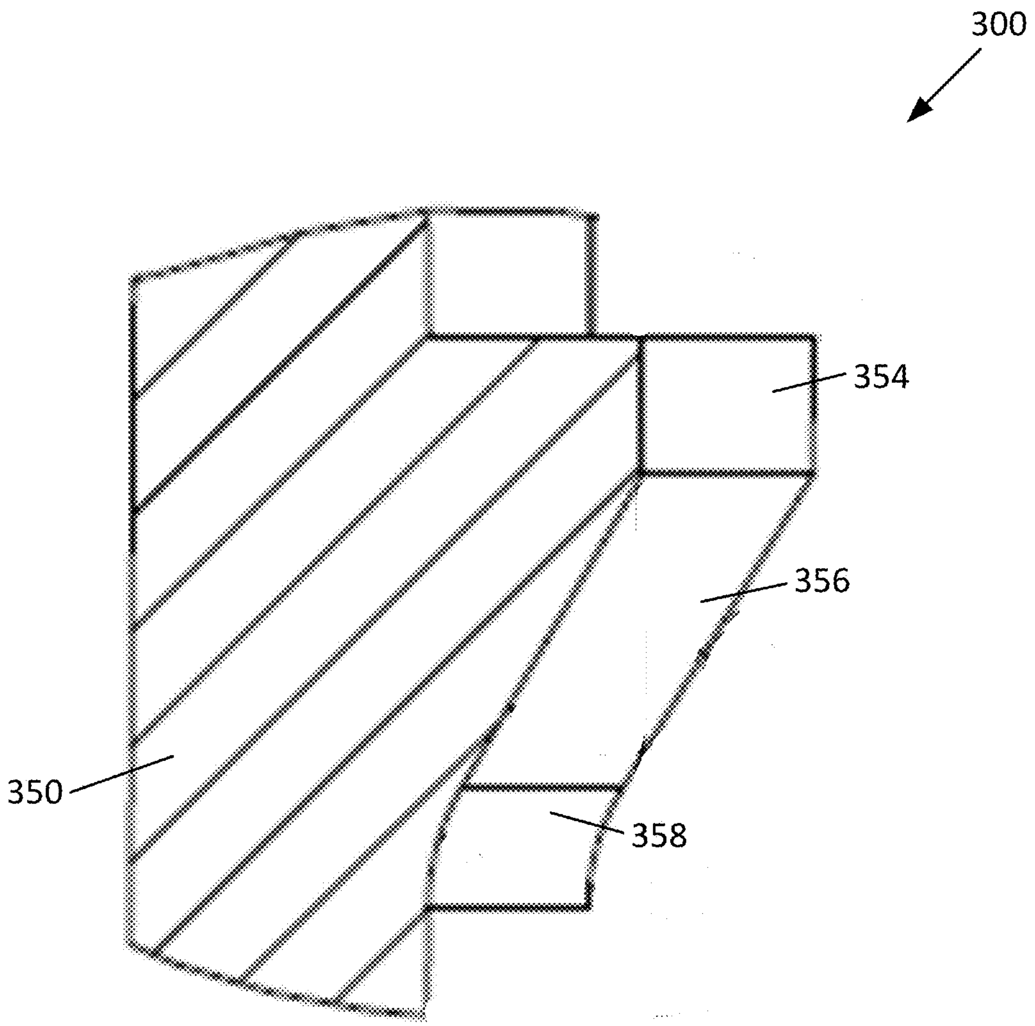
FIG. 18 is a close-up cross-sectional perspective view of a coupling structure of the accessory illustrated in FIG. 17 shown in the circle labeled "18".

Similarly, coupling structure 340 has a similar structure that includes a vertical portion with a bottom surface, and a horizontal portion with angled surfaces and curved surfaces on opposite sides of the vertical portion. The bottom surface engages one of the engagement members or ramps 140, 150, and 250 when the cap 300 is mounted onto the collar 110 of the neck portion 100. Also, coupling structure 350 has a similar structure. As shown in FIG. 18, coupling structure 350 has a horizontal portion 354, an angled surface 356, and a curved surface 358. A close-up view of horizontal portion 354 and surfaces 356 and 358 is illustrated.

Figure 19:
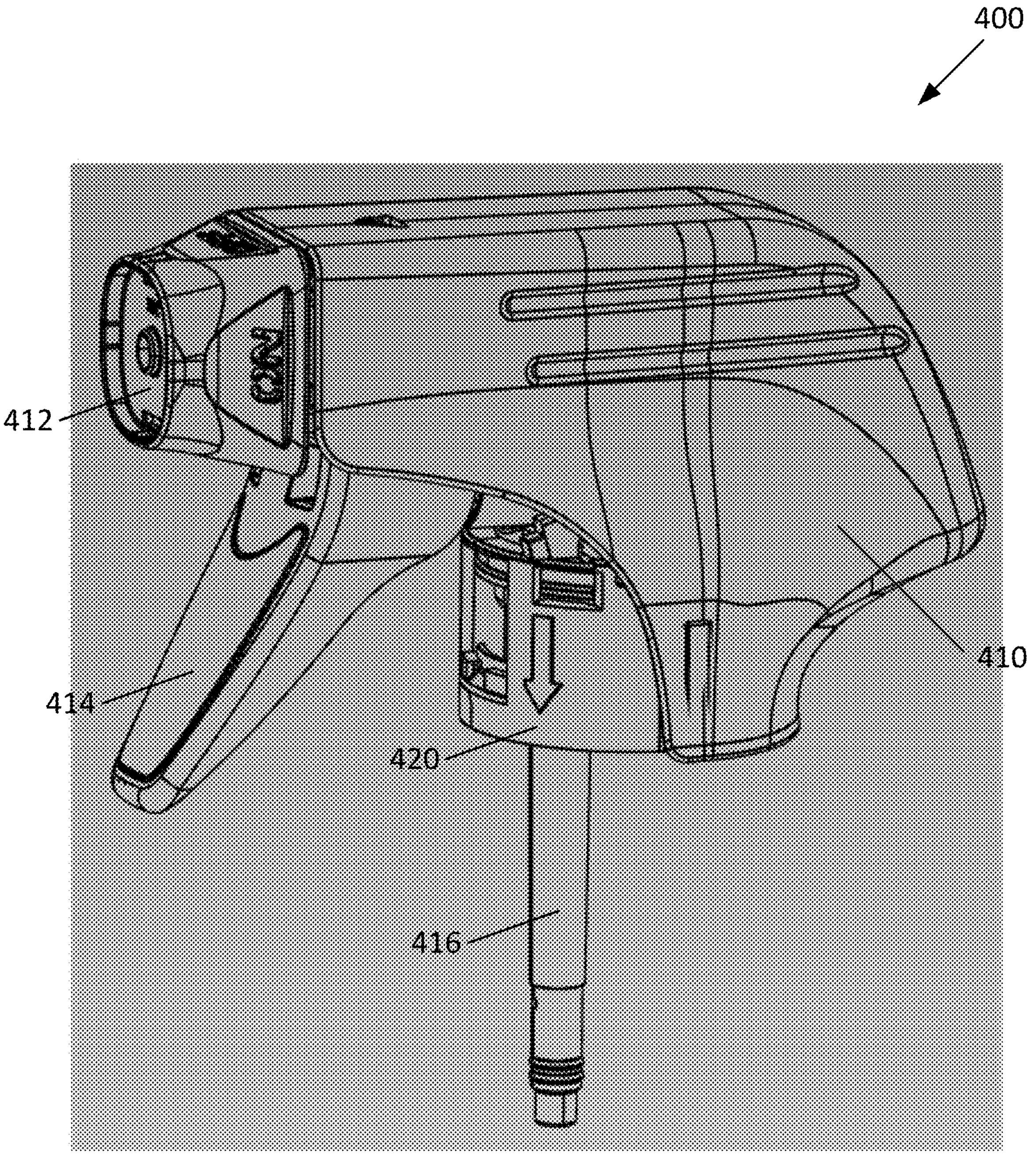
FIG. 19 (Prior Art)
FIG. 19 is a perspective view of an embodiment of a prior art accessory that can be coupled to the neck portion illustrated in FIG. 2.
Figure 20:
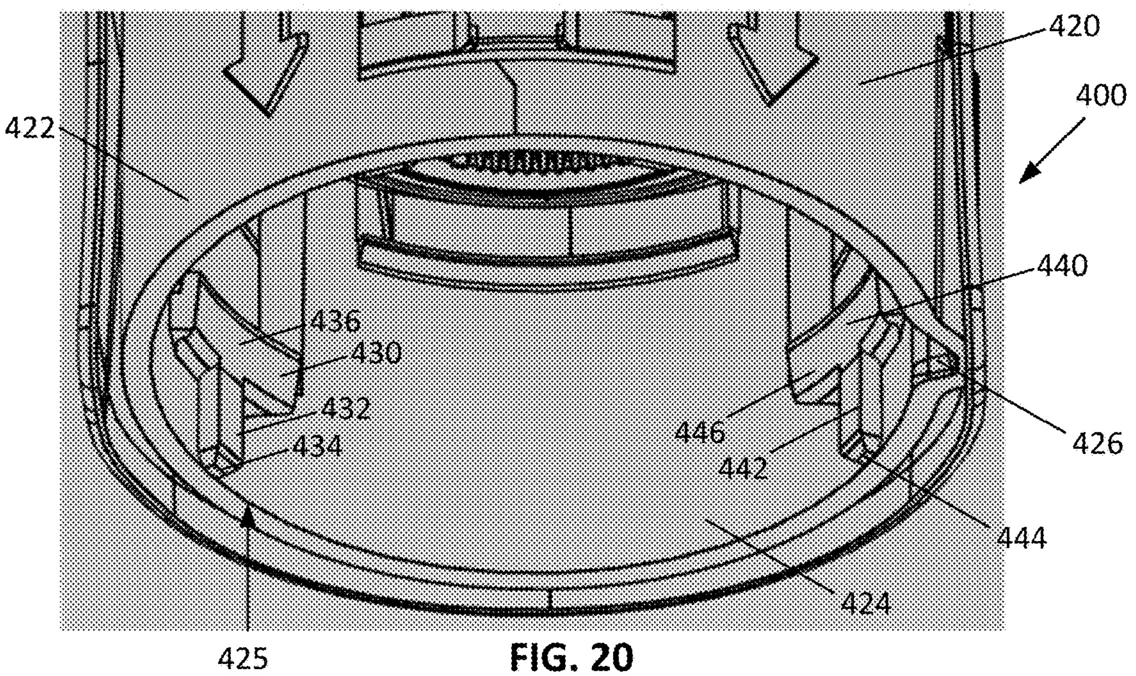
FIG. 20 (Prior Art)
FIG. 20 is a bottom perspective view of the coupling portion of the prior art accessory illustrated in FIG. 19
Figure 21:
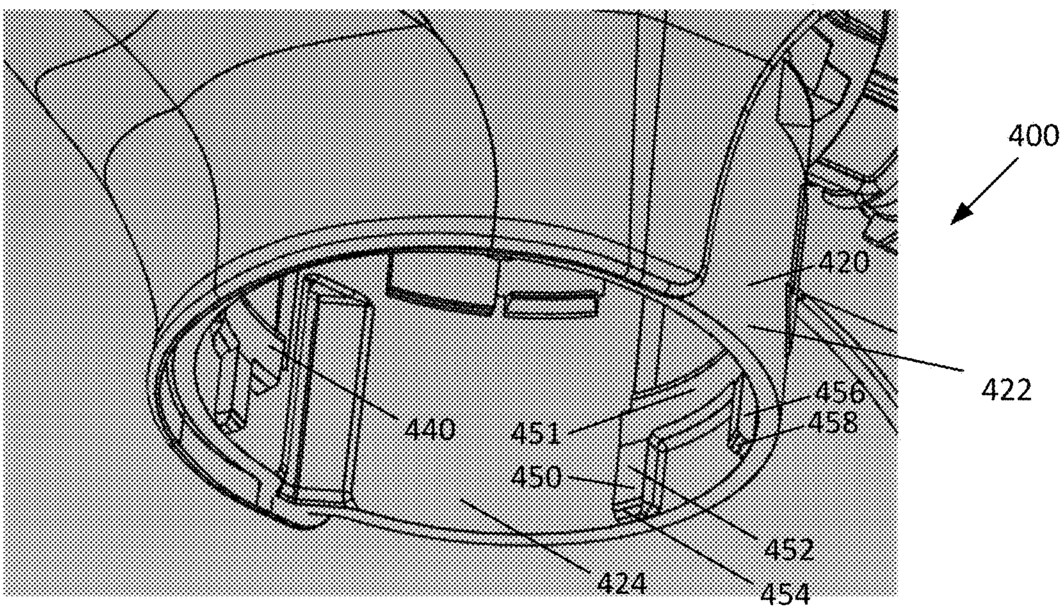
FIG. 21 (Prior Art)
FIG. 21 is another bottom perspective view of the coupling portion of the prior art accessory illustrated in FIG. 19.

Turning to FIGS. 19-21, different views of an embodiment of a prior art accessory that can be used with the body 90 are illustrated. In this embodiment, the accessory 400 is a spray head or trigger dispensing head that can be manipulated to dispense a spray of liquid from the body 90. Accessory 400 includes a body 410 with an outlet 412 through which a liquid can flow when the trigger 414 is pulled. While not present in each embodiment of a dispensing head, this embodiment includes a connector tube 416 that depends downwardly and can be engaged with a corresponding port or opening inside of the body 90. In other embodiments in which a connector 416 is not present, the preciseness of mounting the dispensing head on the neck portion is not as critical.

The accessory 400 includes a skirt or connecting portion 420 that is connectable to the neck portion 100 of the body 90. Turning to FIG. 20, the skirt 420 has an outer surface 422 and an inner surface 424 opposite to the outer surface 422. The inner surface 424 includes a notch 426 formed therein that receives one of the projections of the coupling portion 130 of the neck portion 100.

In this embodiment, the skirt 420 includes a coupling portion 425 that includes several coupling structures or couplers that engage the coupling portion 130 of the neck portion 100. Coupling structure 430 includes a body 432 that has a lower end 434 that contacts and slides along the ramp surfaces 142, 152, and 252 of the ramps 140, 150, and 250. The coupling structure 430 also includes a horizontal portion 436 that can be located between the set of projections 180, 190, and 200 or the set of projections 210, 220, and 230 in the coupling portion 130. Similarly, coupling structure 440 includes a body 442 that has a lower end 444 that contacts and slides along the ramp surfaces 142, 152, and 252 of the ramps 140, 150, and 250. The coupling structure 440 also includes a horizontal portion 446 that can be located between the set of projections 180, 190, and 200 or the set of projections 210, 220, and 230 in the coupling portion 130.

Turning to FIG. 21, coupling structure 450 has a slightly different embodiment than coupling structures 430 and 440. Coupling structure 450 has a horizontal portion 451 and two downwardly oriented bodies 452 and 456 that have lower ends 454 and 458, respectively. The lower ends 454 and 458 engages the ramp surfaces 142, 152, and 252 of the ramps 140, 150, and 250 as the accessory 400 is rotated relative to the neck portion 100.

In one exemplary embodiment, a method may include several steps. In one embodiment of a method, the accessory can be mounted onto a neck portion of a body. One step is to engage an accessory with the neck portion of a body. The accessory can then be rotated relative to the neck portion in a first direction so that a first contact member of the accessory slides along the first engagement member and the first engagement member guides movement of the accessory relative to the neck portion as the accessory is rotated. Once the accessory has been rotated onto the neck portion, the accessory can be secured in a locked position on the neck portion. The first engagement member can be a first ramp having a first ramp surface, and the step of engaging the accessory with the neck portion includes engaging the first contact member of the accessory with the first ramp surface of the first ramp. The method may also include engaging the accessory with the neck portion so that the second contact member of the accessory engages the second ramp surface of the second ramp, and the third contact member of the accessory engages the third ramp surface of the third ramp.

To remove the accessory from the body, the method may also include the step of moving the accessory from the locked position; and rotating the accessory relative to the neck portion in a second direction opposite to the first direction so that the first contact member of the accessory slides along the first engagement member and the first engagement member guides movement of the accessory relative to the neck portion in a third direction away from the body.

In various embodiments, the structures disclosed herein can be used for any type of spray bottle for cleaning products, beverages such as wine, oils such as motor oils, and other chemical solutions.

Like numbers refer to like elements throughout. The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

It will also be understood that, as used herein, the terms "example," "exemplary," and derivatives thereof are intended to refer to non-limiting examples and/or variants embodiments discussed herein, and are not intended to indicate preference for one or more embodiments discussed herein compared to one or more other embodiments.

The term "comprising" which is synonymous with "including," "containing," or "characterized by," is inclusive or open-ended and does not exclude additional, unrecited elements or method steps. The term "consisting essentially of" limits the scope of a claim to the specified materials or steps "and those that do not materially affect the basic and novel characteristic(s)" of the claimed invention. The term "consisting of" as used herein, excludes any element, step, or ingredient not specified in the claim.

All publications, patents and patent applications cited herein, whether supra or infra, are hereby incorporated by reference in their entirety to the same extent as if each individual publication, patent or patent application was specifically and individually indicated to be incorporated by reference.

The invention being thus described, it will be apparent that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus, comprising:

a body defining a chamber, the body including a neck portion having a collar with an outer surface, the outer surface of the neck portion including a plurality of engagement members thereon, the plurality of engagement members includes a first engagement member, the first engagement member is a first ramp that extends outwardly from the outer surface of the collar, the first ramp includes a first ramp surface that is oriented perpendicularly to the outer surface of the neck portion, the first ramp surface extends to an upper planar end of the first ramp, and the upper planar end extends to a vertical surface that is on an opposite end of the first engagement member from the first ramp surface; and an accessory removably coupleable to the body, the accessory is rotatable on the neck portion in a first direction and in a second direction opposite the first direction, wherein the accessory includes a coupling portion with a coupling structure that engages with at least one of the plurality of engagement members on the neck portion of the body to couple the accessory to the body, and the first ramp guides the accessory onto the neck portion of the body for mounting thereto, and also assists with removal of the accessory from the neck portion, and wherein the coupling structure slides along the first ramp surface which guides the accessory onto the neck portion when the accessory rotates in the first direction, and the coupling structure slides along the first ramp surface which directs the accessory off the neck portion when the accessory rotates in the second direction.

2. The apparatus of claim 1, wherein the plurality of engagement members also includes a second engagement member spaced apart from the first engagement member, and the second engagement member is a second ramp having a second ramp surface.

3. The apparatus of claim 2, wherein the first ramp has a first height, the second ramp has a second height, and the second height is different from the first height.

4. The apparatus of claim 1, wherein the plurality of engagement members also includes a second engagement member and a third engagement member, each of the second engagement member and the third engagement member being spaced apart from each other and from the first engagement member, the second engagement member is a second ramp, and the third engagement member is a third ramp.

5. The apparatus of claim 4, wherein the first ramp has a first height, the second ramp has a second height, and the third ramp has a third height, and each of the first height, the second height, and the third height is different from the other ones of the first height, the second height, and the third height.

6. The apparatus of claim 4, wherein the neck portion has a longitudinal axis extending therethrough, the second ramp has a second ramp surface, and the third ramp has a third ramp surface, and each of the first ramp surface, the second ramp surface, and the third ramp surface is oriented in the same direction about the longitudinal axis.

7. The apparatus of claim 4, wherein the coupling structure is a first coupling structure, the accessory includes a second coupling structure and a third coupling structure, and each of the first coupling structure, the second coupling structure, and the third coupling structure engages one of the first ramp, the second ramp, and the third ramp when the accessory is engaged with the neck portion.

8. An apparatus, comprising:

a body defining a chamber, the body including a neck portion having a collar with an outer surface and a longitudinal axis, the outer surface of the neck portion including a plurality of engagement members thereon, the plurality of engagement members includes a first engagement member and a second engagement member separate from and spaced apart from the first engagement member about the longitudinal axis, the first engagement member is a first ramp that extends outwardly from the outer surface, the first ramp includes a first ramp surface that is oriented perpendicularly to the outer surface, the second engagement member is a second ramp that extends outwardly from the outer surface, the second ramp includes a second ramp surface that is oriented perpendicularly to the outer surface, the first ramp surface and the second ramp surface being oriented and inclined in the same direction as each other, a height of the second ramp surface being different from a height of the first ramp surface; and an accessory removably coupleable to the body, the accessory includes a coupling portion with a first coupling structure and a second coupling structure spaced apart from the first coupling structure, wherein when the accessory is engaged with the neck portion, the accessory can be rotated in a first direction relative to the neck portion and in a second direction relative to the neck portion, the second direction being opposite to the first direction, the first coupling structure and the second coupling structure slide along the first engagement member and the second engagement member, respectively, when the accessory is rotated in the first direction, and the first coupling structure and the second coupling structure slide along the first engagement member and the second engagement member, respectively, when the accessory is rotated in the second direction.

9. The apparatus of claim 8, wherein the first engagement member and the second engagement member guide the accessory onto the neck portion when the accessory is rotated in the first direction, and the first engagement member and the second engagement member direct the accessory off the neck portion when the accessory is rotated in the second direction.

10. An apparatus for dispensing a product, the apparatus comprising:

a body defining a chamber, the body including a neck portion having a collar with an outer surface, the outer surface of the neck portion including a plurality of engagement members thereon, the plurality of engagement members includes a first engagement member, the first engagement member is a first ramp that extends outwardly from the outer surface of the collar, the first ramp includes a first ramp surface that is oriented perpendicularly to the outer surface of the neck portion, the first ramp surface extends to an upper planar end of the first ramp, and the upper planar end extends to a vertical surface that is on an opposite end of the first engagement member from the first ramp surface, the first ramp surface having a first height that is less than a height of the collar; and a dispensing mechanism removably coupleable to the body, wherein the dispensing mechanism includes a coupling portion with a coupling structure that engages with at least one of the plurality of engagement members on the neck portion of the body to couple the dispensing mechanism to the body, and the first ramp surface guides the dispensing mechanism onto the neck portion of the body for mounting thereto as the coupling structure slides along the first ramp surface, and also assists with removal of the dispensing mechanism from the neck portion as the coupling structure slides along the first ramp surface.

11. The apparatus of claim 10, wherein the plurality of engagement members includes a second engagement member and a third engagement member, the second engagement member is a second ramp having a second ramp surface, the third engagement member is a third ramp having a third ramp surface, and the dispensing mechanism includes a second contact member and a third contact member.

12. The apparatus of claim 11, wherein the second ramp has a second height, and the third ramp has a third height, and each of the first height, the second height, and the third height is different from the other ones of the first height, the second height, and the third height.

13. The apparatus of claim 2, wherein the first ramp surface and the second ramp surface are oriented and inclined in the same direction as each other.

14. The apparatus of claim 12, wherein the first ramp surface and the second ramp surface are oriented and inclined in the same direction as each other.

15. The apparatus of claim 2, wherein the coupling portion includes a first projection located at an upper end of the second ramp, the first projection has a first lower surface, a first planar portion with a constant thickness, and a first angled portion having a first tapered profile from a first thinner end proximate to the first planar portion to a first thicker end proximate to the first lower surface.

16. The apparatus of claim 15, wherein the coupling portion includes a second projection proximate to and spaced apart from the first projection, the second projection has a second lower surface, a second planar portion with a constant thickness, and a second angled portion having a second tapered profile from a second thinner end proximate to the second planar portion to a second thicker end proximate to the second lower surface.

17. The apparatus of claim 16, wherein the collar has a longitudinal axis, and the first projection and the second projection prevent the accessory in a locked position on the neck portion from being pulled directly off the neck portion along the longitudinal axis.

18. The apparatus of claim 9, wherein the coupling portion includes a third coupling structure, the plurality of engagement members includes a third engagement member that is a third ramp having a third ramp surface, and the third coupling structure engages the third engagement member.

* * * * *